(12) United States Patent
Yamamoto

(10) Patent No.: US 8,275,862 B2
(45) Date of Patent: Sep. 25, 2012

(54) RFID TAG INFORMATION SERVICE SYSTEM

(75) Inventor: Kazutaka Yamamoto, Nagoya (JP)

(73) Assignee: Brother Kogyo Kabushiki Kaisha, Nagoya-Shi, Aichi (JP)

( * ) Notice: Subject to any disclaimer, the term of this patent is extended or adjusted under 35 U.S.C. 154(b) by 846 days.

(21) Appl. No.: 12/381,627

(22) Filed: Mar. 13, 2009

(65) Prior Publication Data

US 2009/0243812 A1    Oct. 1, 2009

(30) Foreign Application Priority Data

Mar. 26, 2008    (JP) .................................. 2008-080693

(51) Int. Cl.
*G06F 15/16* (2006.01)
*G06F 15/177* (2006.01)
*H04Q 5/22* (2006.01)

(52) U.S. Cl. ..... 709/220; 709/222; 709/245; 340/10.52; 340/572.1; 707/600; 707/E17.044; 707/999.1

(58) Field of Classification Search .......... 709/220–222, 709/225, 245, 250; 713/156, 160, 165, 189–190, 713/167–170, 176–181, 200; 707/600, 999.01, 707/E17.009, E17.999; 340/572.1–572.9, 340/10.5–52, 9.16
See application file for complete search history.

(56) References Cited

U.S. PATENT DOCUMENTS

| | | | |
|---|---|---|---|
| 6,793,127 B2 * | 9/2004 | Alsafadi et al. | 235/375 |
| 6,940,953 B1 * | 9/2005 | Eberle et al. | 379/88.13 |
| 7,430,410 B2 | 9/2008 | Iwatsu et al. | |
| 7,609,053 B2 * | 10/2009 | Hsu et al. | 324/757.03 |
| 7,701,341 B2 * | 4/2010 | Kumar et al. | 340/572.1 |
| 8,001,226 B2 * | 8/2011 | Matsumoto et al. | 709/223 |
| 2002/0004767 A1 * | 1/2002 | Okamoto et al. | 705/28 |
| 2002/0143643 A1 * | 10/2002 | Catan | 705/26 |
| 2003/0216983 A1 * | 11/2003 | Bodin | 705/35 |
| 2005/0251678 A1 * | 11/2005 | Okamoto et al. | 713/168 |
| 2005/0262188 A1 * | 11/2005 | Mamou et al. | 709/203 |
| 2005/0283614 A1 * | 12/2005 | Hardt | 713/182 |
| 2006/0015408 A1 * | 1/2006 | Brown | 705/22 |
| 2006/0047464 A1 * | 3/2006 | Kumar et al. | 702/122 |
| 2006/0094411 A1 * | 5/2006 | Dupont | 455/417 |
| 2006/0179079 A1 * | 8/2006 | Kolehmainen | 707/104.1 |
| 2007/0046467 A1 * | 3/2007 | Chakraborty et al. | 340/572.1 |
| 2007/0061335 A1 * | 3/2007 | Ramer et al. | 707/10 |
| 2007/0112574 A1 * | 5/2007 | Greene | 705/1 |
| 2007/0226314 A1 * | 9/2007 | Eick et al. | 709/217 |
| 2007/0262864 A1 * | 11/2007 | Yasui et al. | 340/572.1 |
| 2007/0273517 A1 * | 11/2007 | Govind | 340/572.1 |
| 2008/0074264 A1 * | 3/2008 | Sharpe et al. | 340/572.1 |

(Continued)

FOREIGN PATENT DOCUMENTS

JP    A-2003-242119    8/2003

(Continued)

*Primary Examiner* — Alina N. Boutah
(74) *Attorney, Agent, or Firm* — McCarter & English, LLP

(57) ABSTRACT

A single unified server transmits/receives information in a common interface format with respect to a plurality of service servers and a portable terminal and has a common database in a data format corresponding to the common interface format, and the plurality of service servers connects to clients in a specific interface format to provide services by individual applications, respectively, and coverts a data format between higher-rank data transmitted/received in the common interface format and lower-rank data transmitted/received in the specific interface format. The portable terminal transmits/receives information in the common interface format using the application.

6 Claims, 22 Drawing Sheets

U.S. PATENT DOCUMENTS

| | | | |
|---|---|---|---|
| 2008/0183689 A1* | 7/2008 | Kubota et al. | 707/4 |
| 2008/0252459 A1* | 10/2008 | Butler et al. | 340/572.1 |
| 2008/0277466 A1* | 11/2008 | Dohm et al. | 235/382 |
| 2009/0243814 A1* | 10/2009 | Yamamoto | 340/10.52 |
| 2010/0013603 A1* | 1/2010 | Chatani et al. | 340/10.6 |
| 2010/0134257 A1* | 6/2010 | Puleston et al. | 340/10.4 |
| 2010/0317317 A1* | 12/2010 | Maier et al. | 455/404.2 |
| 2011/0207429 A1* | 8/2011 | Maier et al. | 455/404.2 |

FOREIGN PATENT DOCUMENTS

| | | |
|---|---|---|
| JP | A-2003-248718 | 9/2003 |
| JP | 2005149174 | 6/2005 |
| JP | A-2005-346594 | 12/2005 |
| JP | 2007148503 | 6/2007 |
| JP | A-2007-148503 | 6/2007 |
| WO | WO 2005/015794 | 2/2005 |

* cited by examiner

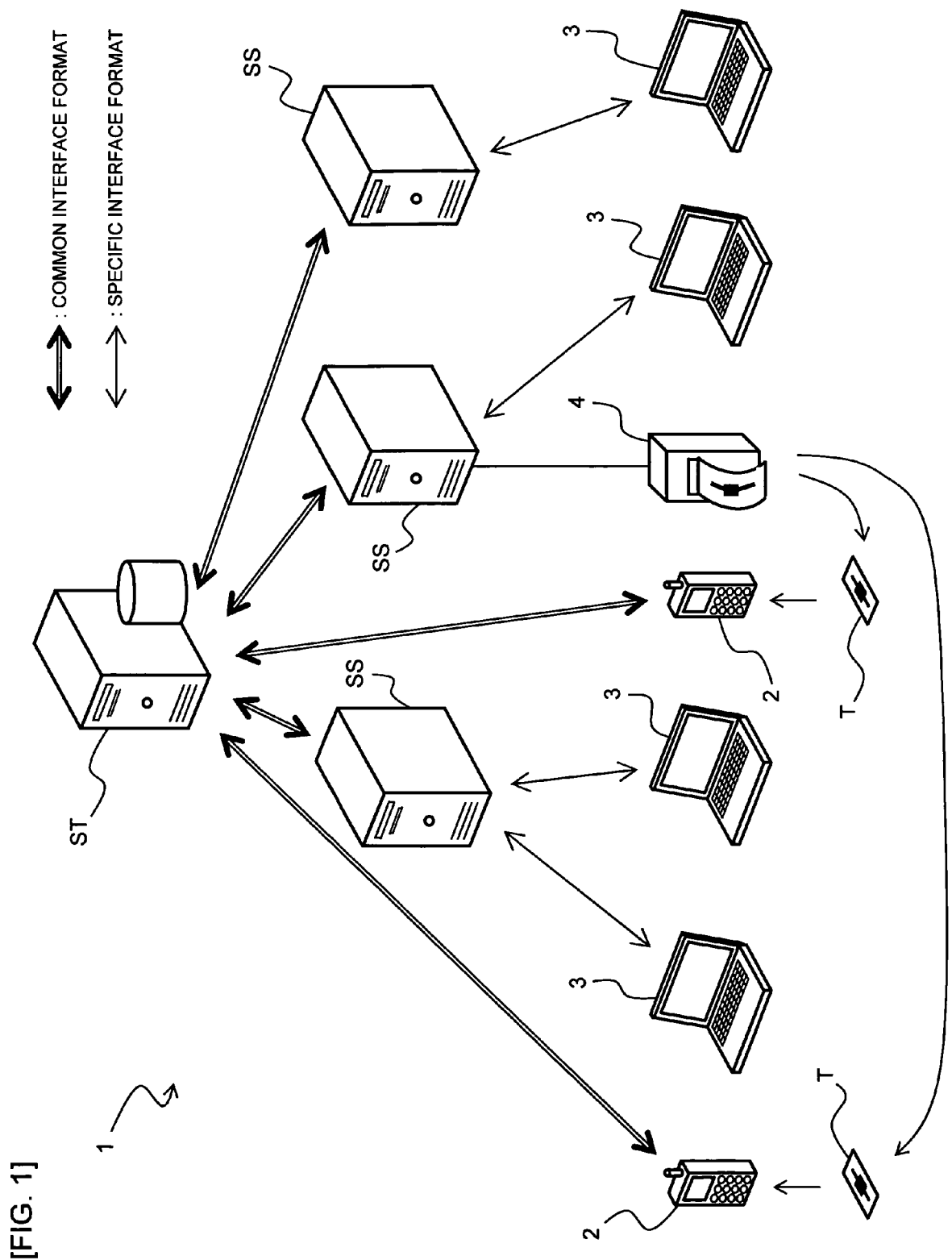
[FIG. 1]

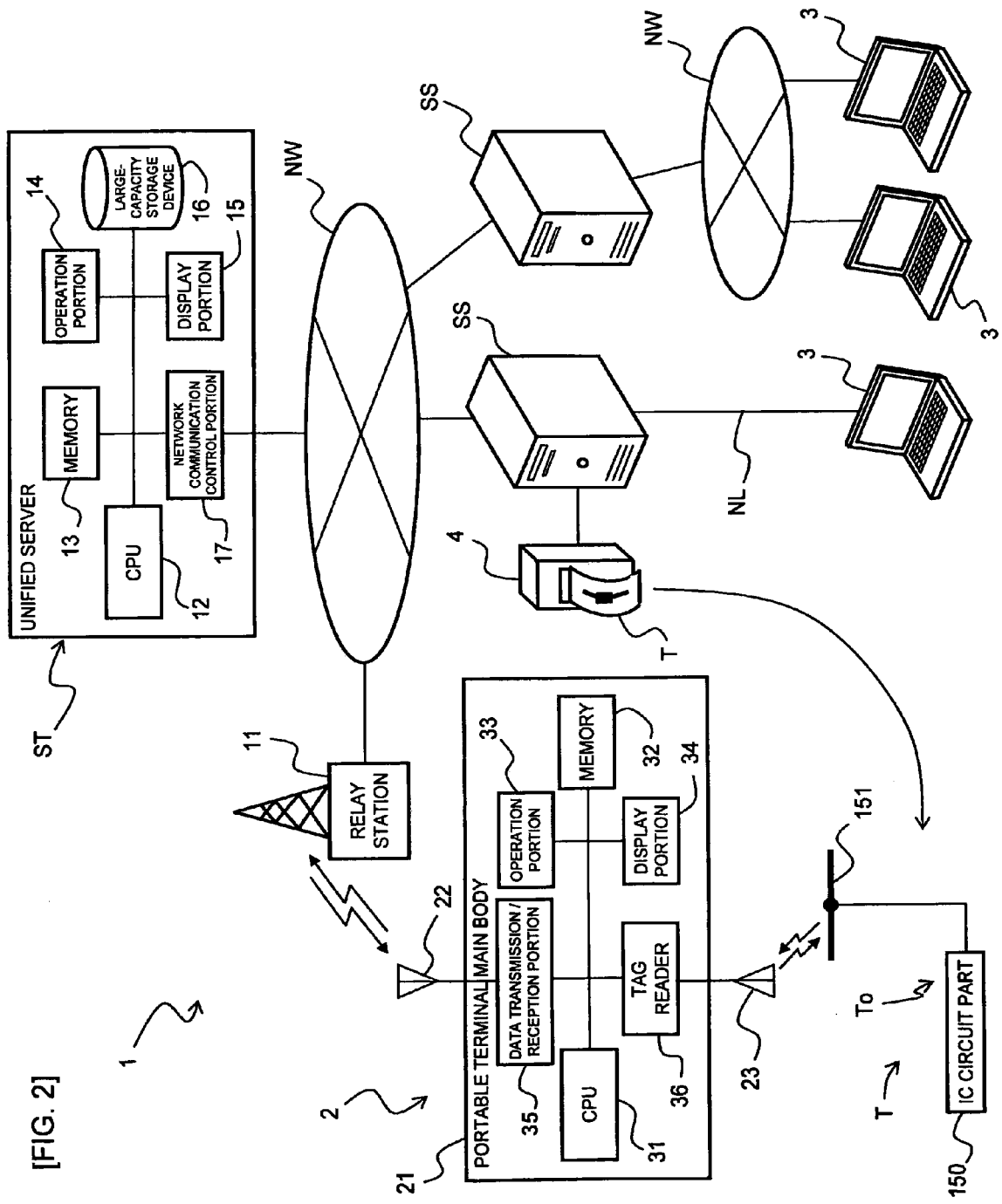
[FIG. 2]

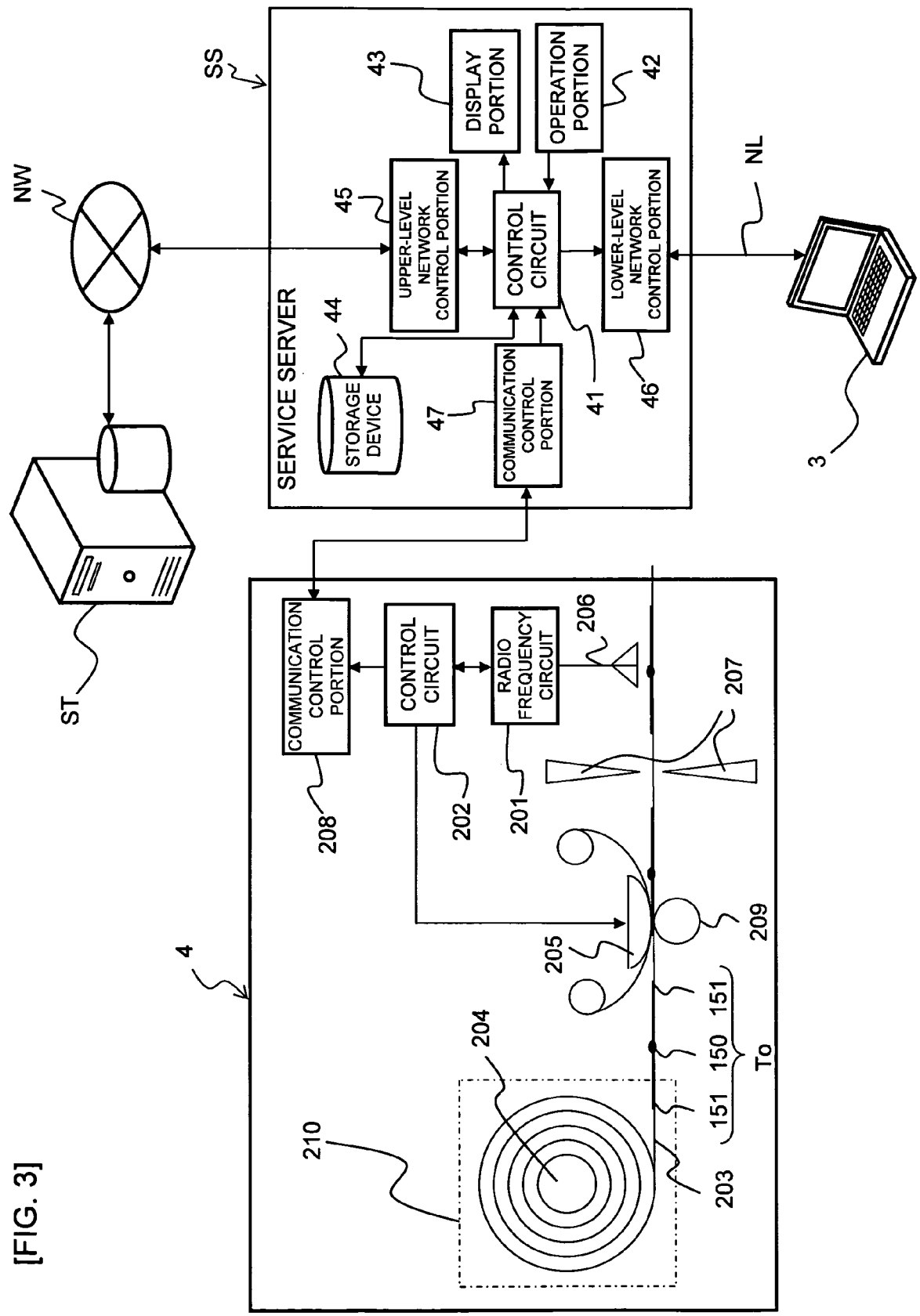
[FIG. 3]

[FIG. 4]
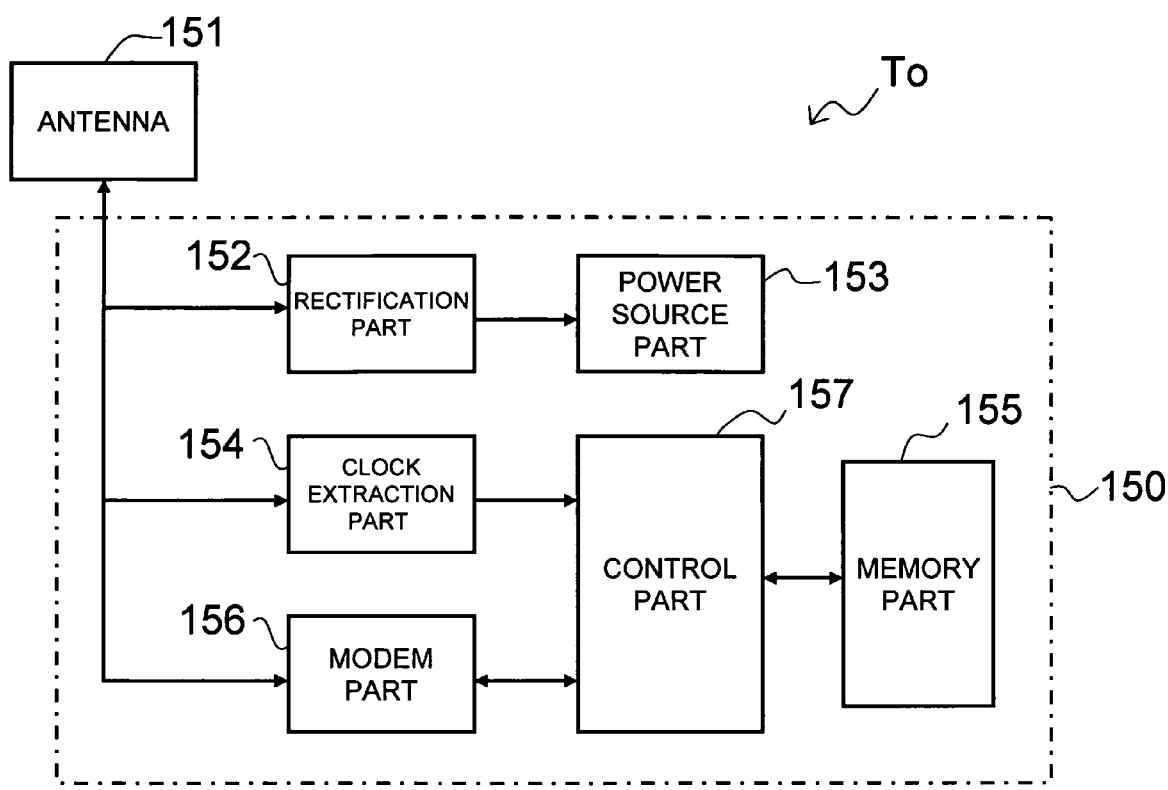

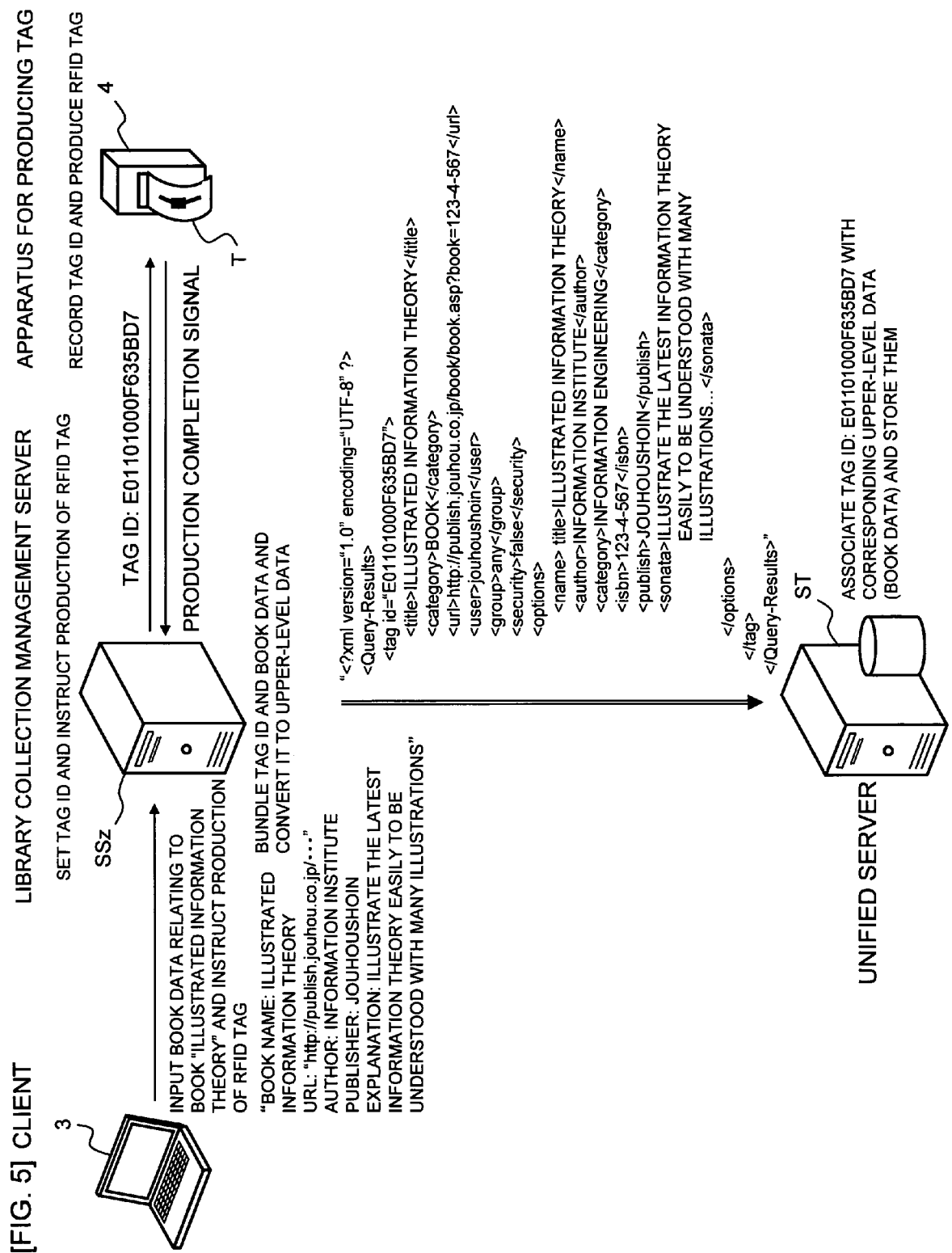

[FIG. 6]

DETAILED DATA OF BOOK (XML FORMAT UPPER-LEVEL DATA)

```
<?xml version="1.0" encoding="UTF-8" ?>
<Query-Results>
    <tag id="E01101000F635BD7">
        <title>ILLUSTRATED INFORMATION THEORY</title>         ⎫
        <category>BOOK</category>                             ⎪
        <url>http://publish.jouhou.co.jp/book/book.asp?book=123-4-567</url>  BASIC ITEM
        <user>jouhoushoin</user>                              ⎬
        <group>any</group>                                    ⎪
        <security>false</security>                            ⎭
        <option>                                              ⎫
            <name> title>ILLUSTRATED INFORMATION THEORY </name>
            <author>INFORMATION INSTITUTE </author>           ⎤
            <category>INFORMATION ENGINEERING </category>     ⎥ A01
            <isbn>123-4-567</isbn>                            ⎥
            <publish>JOUHOUSHOIN</publish>                    ⎦   DETAIL ITEM
            <sonata>ILLUSTRATE THE LATEST INFORMATION THEORY
                    EASILY TO BE UNDERSTOOD WITH MANY
                    ILLUSTRATIONS...</sonata>                 ⎭
        </option>
    </tag>
</Query-Results>
```

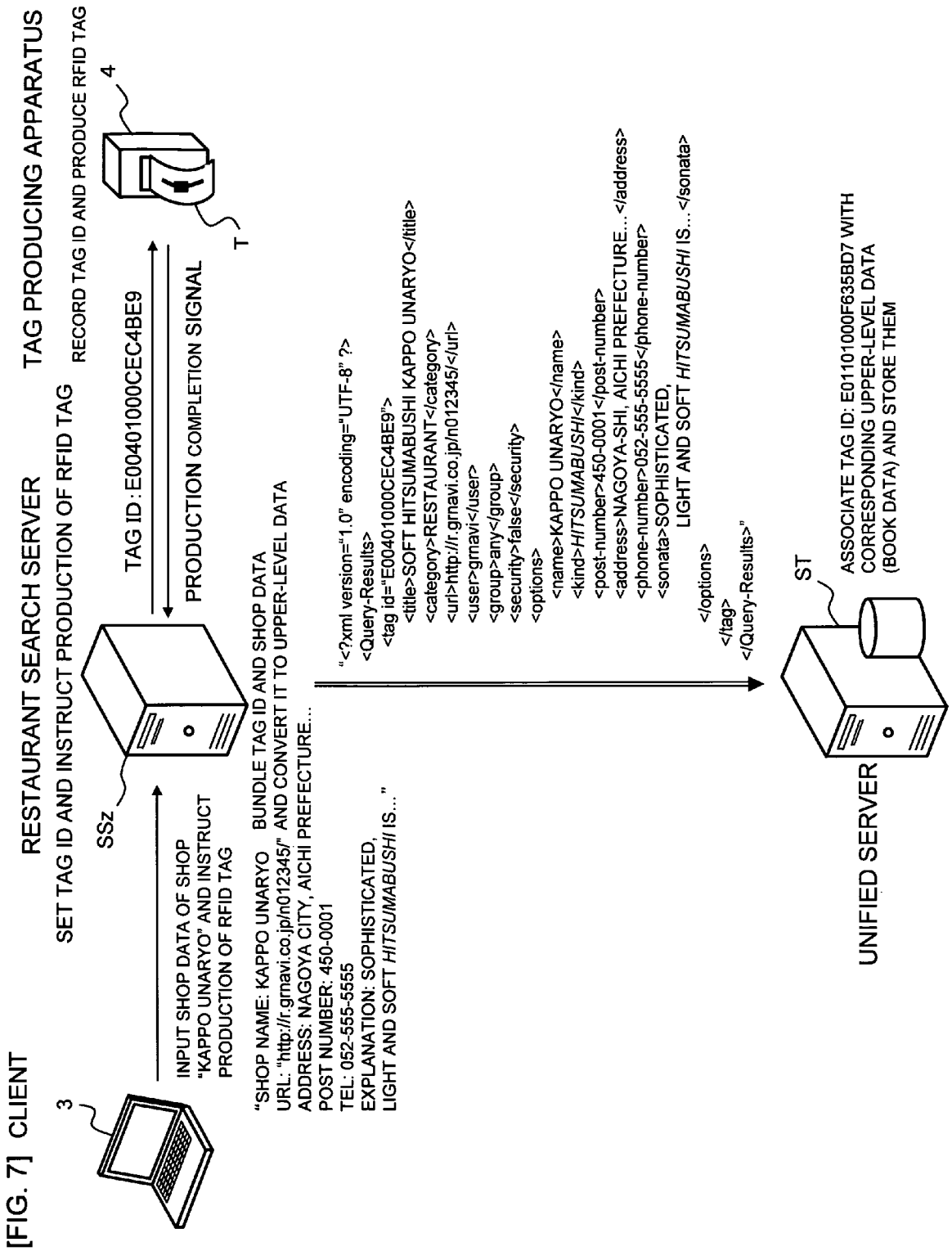

[FIG. 8]

DETAILED DATA OF RESTAURANT (XML FORMAT UPPER-LEVEL DATA)

```
<?xml version="1.0" encoding="UTF-8" ?>
<Query-Results>
    <tag id="E00401000CEC4BE9">
        <title>SOFT HITSUMABUSHI KAPPO UNARYO</title>
        <category>RESTAURANT</category>
        <url>http://r.grnavi.co.jp/n012345/</url>
        <user>grnavi</user>
        <group>any</group>
        <security>false</security>
        <option>
            <name>UNARYO</name>
            <kind>HITSUMABUSHI</kind>
            <post-number>450-0001</post-number>
            <address>NAGOYA-SHI, AICHI PREFECTURE...</address>
            <phone-number>052-555-5555</phone-number>
            <sonata>SOPHISTICATED, LIGHT AND
                    SOFT HITSUMABUSHI IS...</sonata>
        </option>
    </tag>
</Query-Results>
```

BASIC ITEM: title, category, url, user, group, security

DETAIL ITEM: option (name, kind, post-number, address, phone-number, sonata) — A02

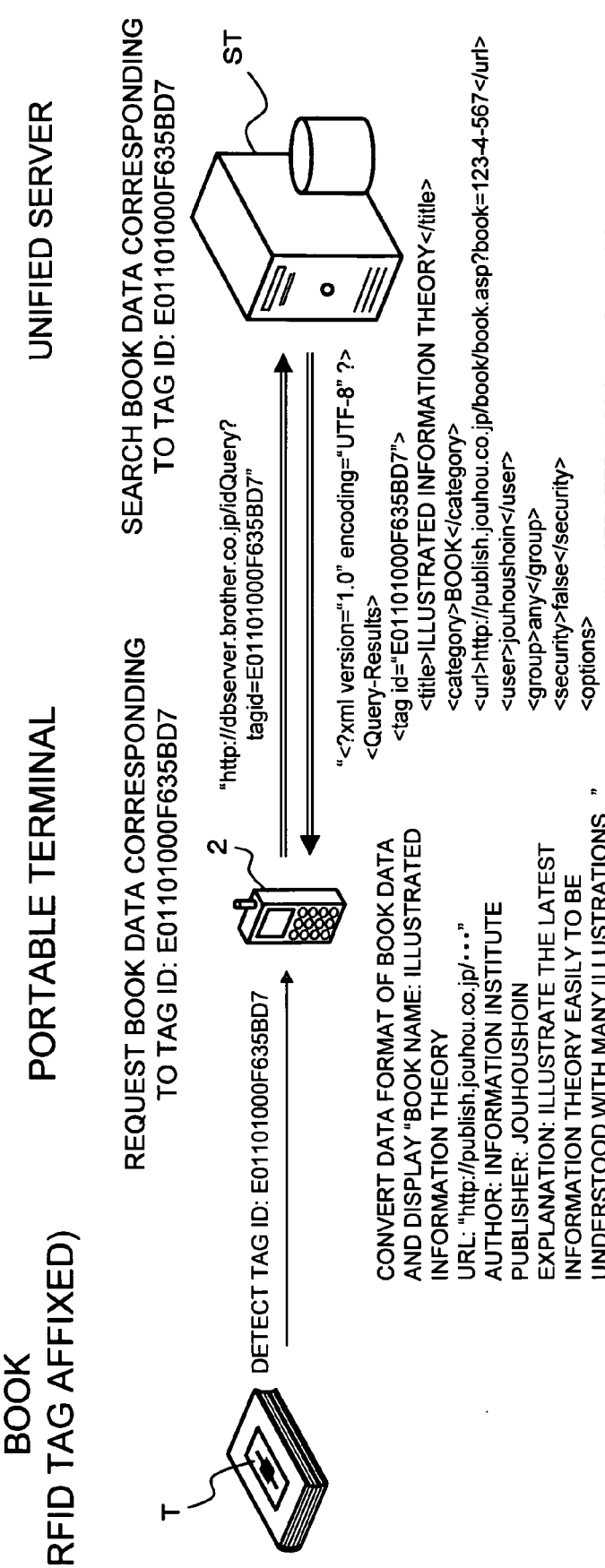
[FIG. 9]

[FIG. 10]
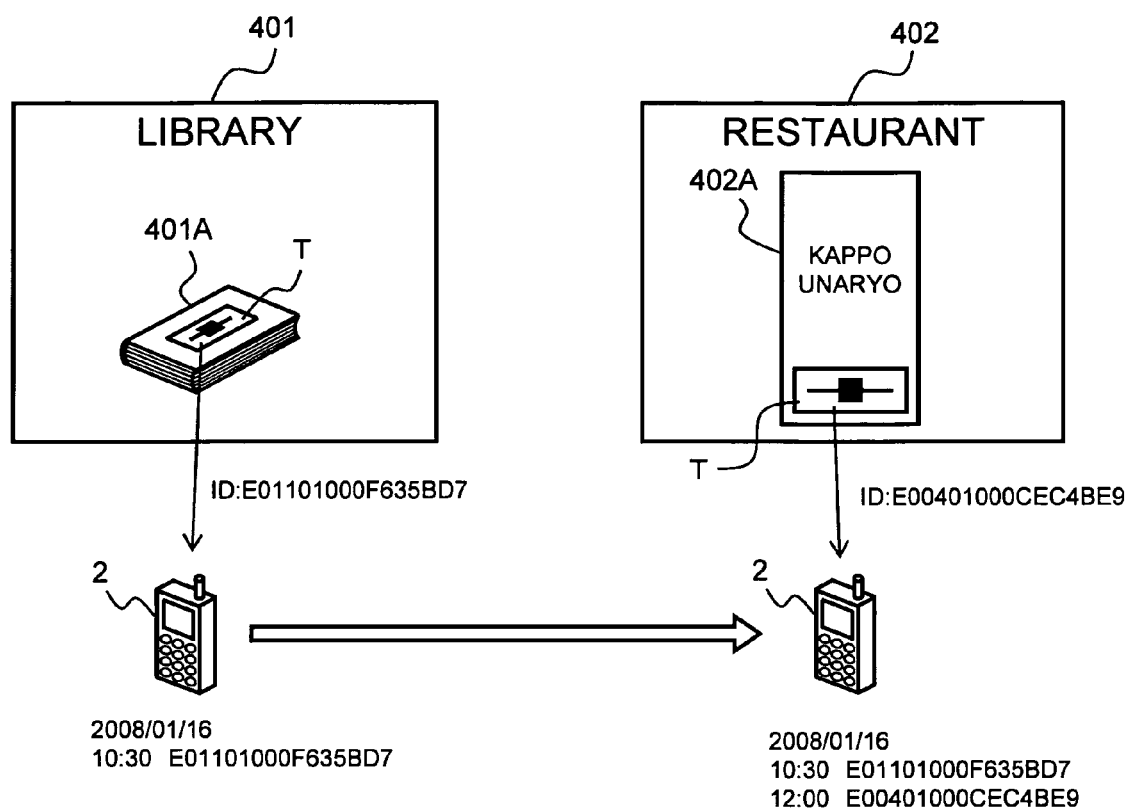

[FIG. 11]
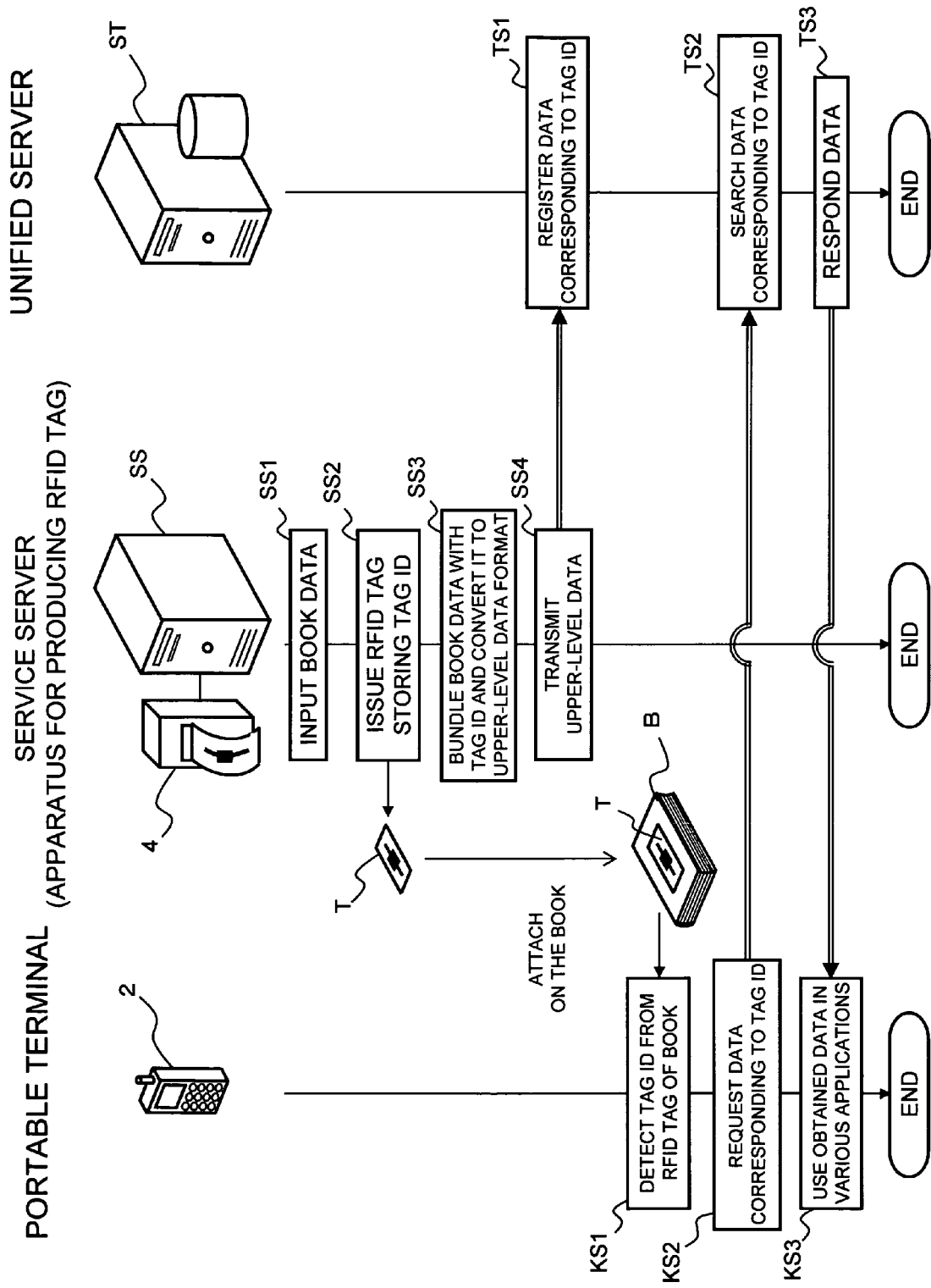

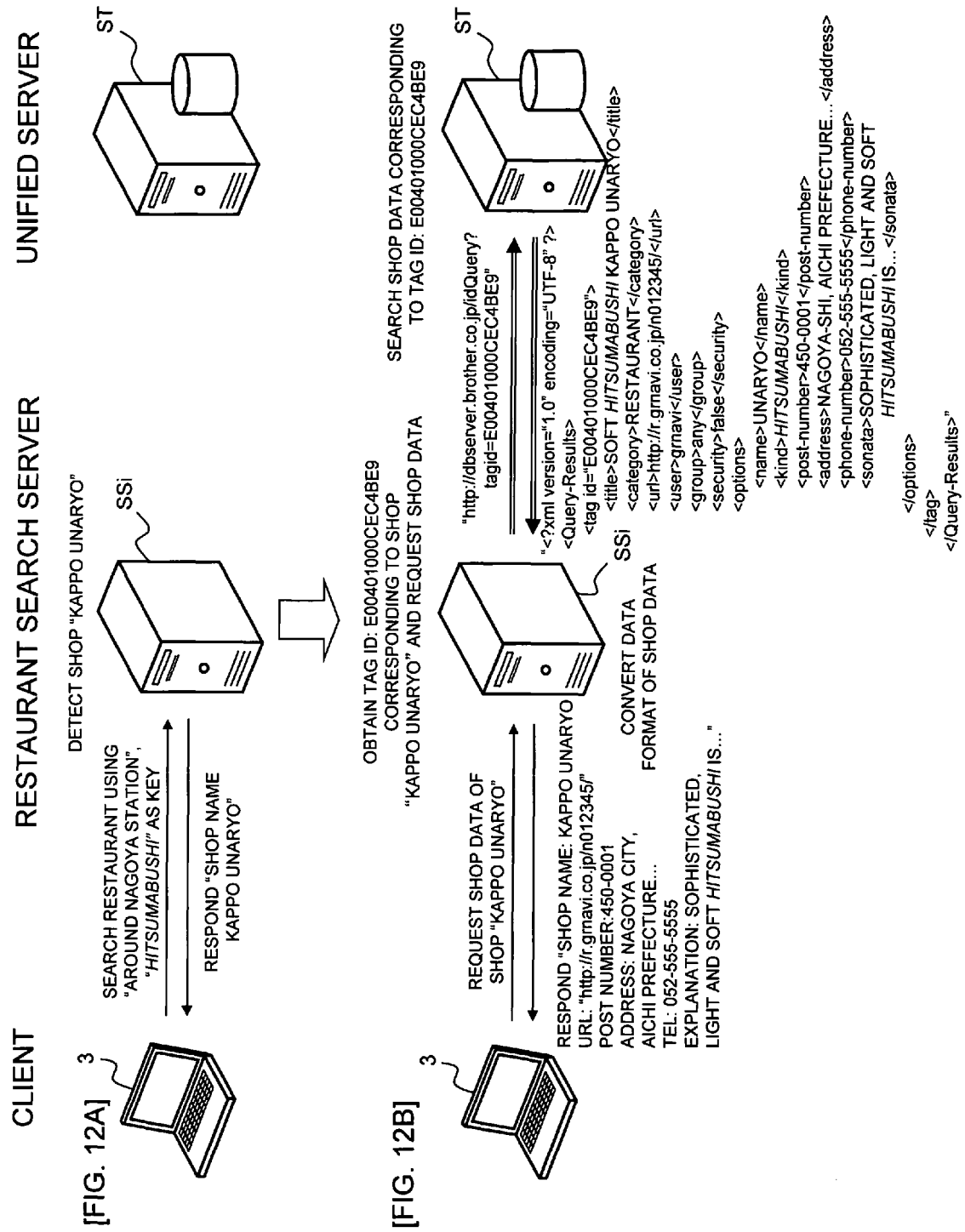

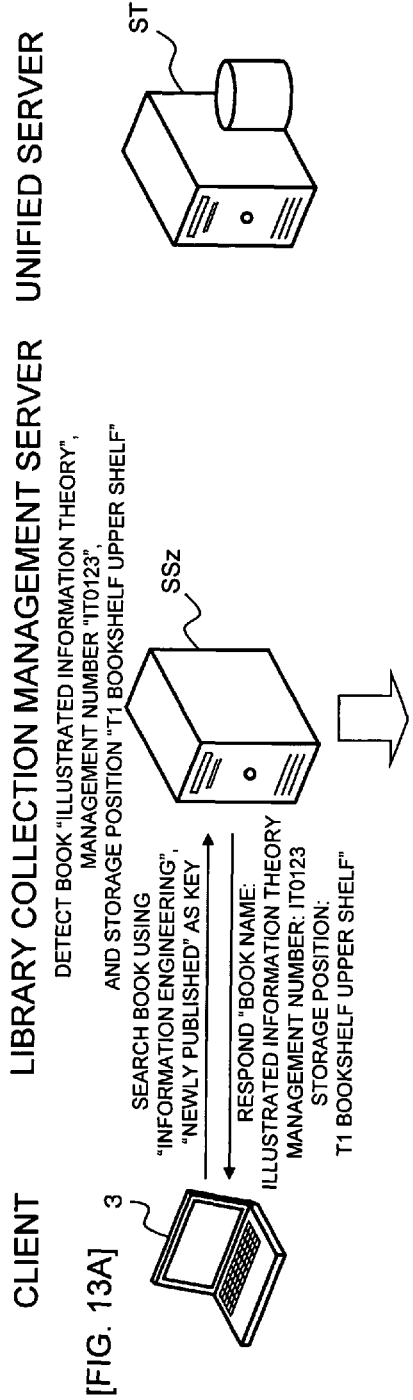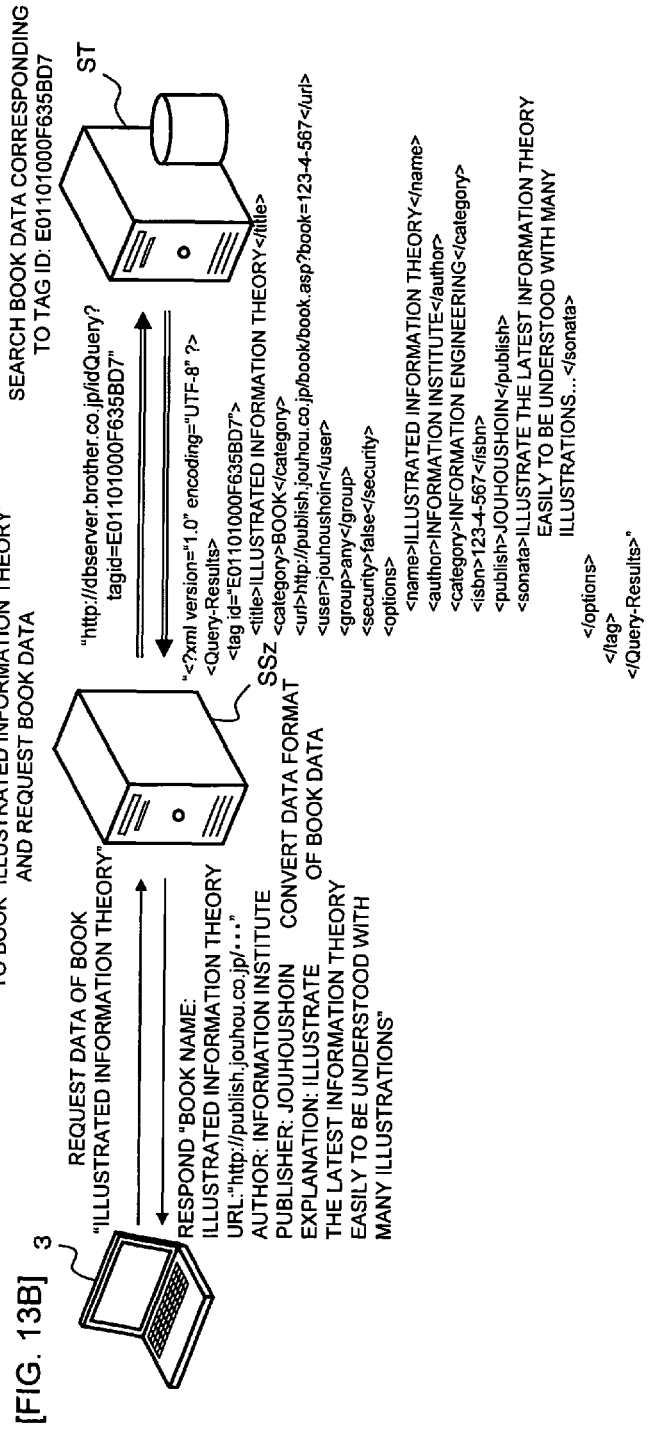

[FIG. 14A]

TABLE FOR RESTAURANT SEARCH SERVER

| TAG ID | SHOP NAME | MENU ITEM | LOCATION | BUDGET | PARKING |
|---|---|---|---|---|---|
| E00401000CEC4BE8 | UNADON-TEI | UNADON | SAKAE-CHO | 1000 | × |
| E00401000CEC4BE9 | KAPPO UNARYO | HITSUMABUSHI | STATION SOUTH | 1500 | ○ |
| E00401000CEC4BEA | UNAGI-BA | UNAJU | STATION NORTH | 1500 | ○ |
| ⋮ | ⋮ | ⋮ | ⋮ | ⋮ | ⋮ |

[FIG. 14B]

TABLE FOR LIBRARY COLLECTION MANAGEMENT SERVER

| TAG ID | BOOK NAME | CLASSIFICATION | MANAGEMENT NUMBER | STORAGE LOCATION |
|---|---|---|---|---|
| E01101000F635BD7 | ILLUSTRATED INFORMATION THEORY | INFORMATION ENGINEERING | ITO123 | T1 BOOKSHELF UPPER SHELF |
| E01101000F635BD6 | TRANSMISSION ENGINEERING | INFORMATION ENGINEERING | ITO123 | T1 BOOKSHELF UPPER SHELF |
| E01101000F635BD5 | SERVER REVIEW | INFORMATION ENGINEERING | ITO123 | T1 BOOKSHELF MIDDLE SHELF |
| ⋮ | ⋮ | ⋮ | ⋮ | ⋮ |

[FIG. 15]
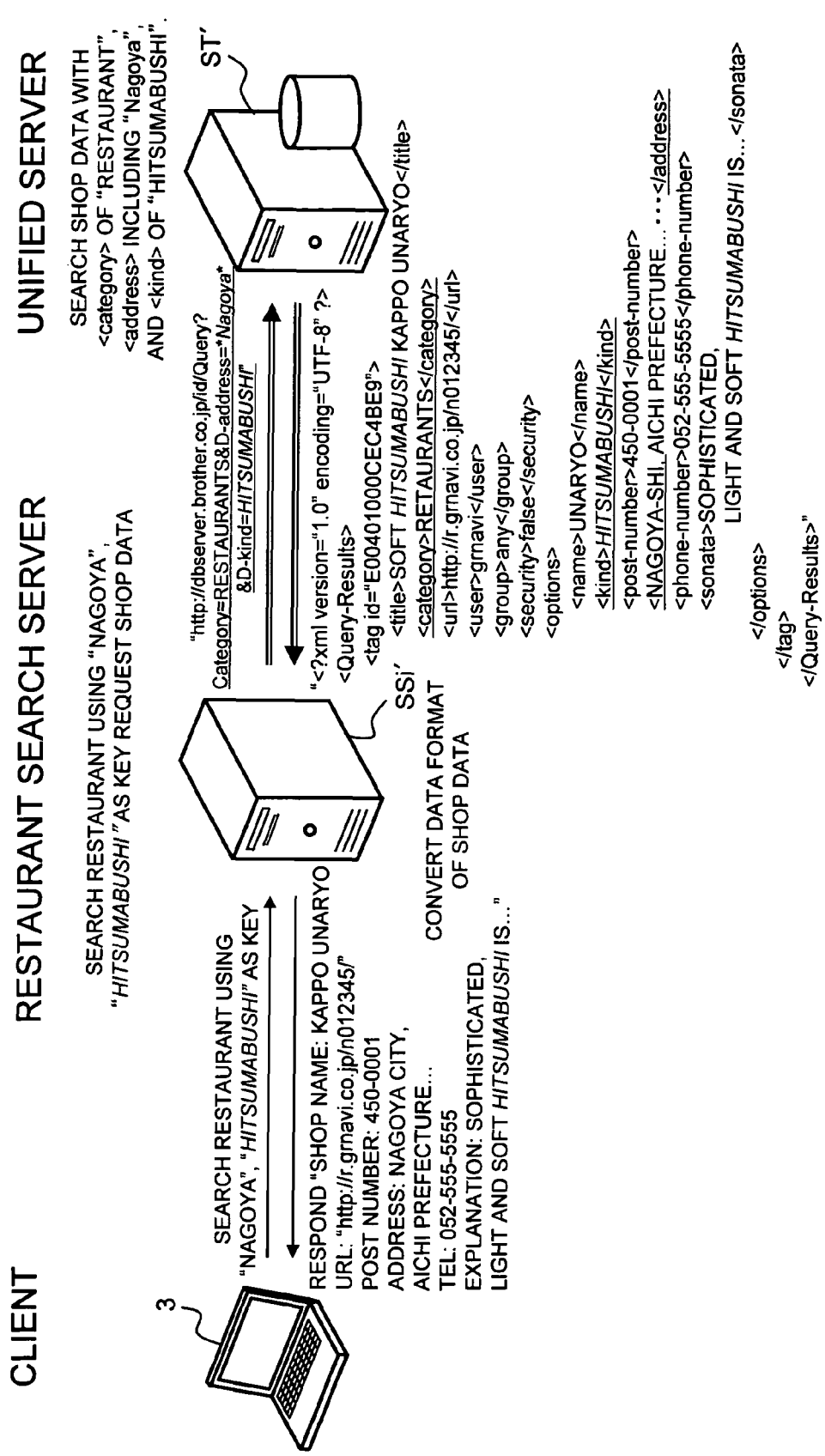

[FIG. 16]

ARTICLE MANAGEMENT SERVER  UNIFIED SERVER

REQUEST DATA OF MANAGEMENT ARTICLE
"PROJECTOR OWNED BY DEVELOPMENT DIVISION"
CORRESPONDING TO TAG ID: E00401000A844BF3

"http://dbserver.brother.co.jp/idQuery?
tagid=E00401000A844BF3"
"User=ichirotanaka"
"Group=Development Division, Brother Industries"

SEARCH DATA CORRESPONDING TO
TAG ID: E00401000A844BF3

RESPOND ONLY IF RECEIVED User INFORMATION
AND Group INFORMATION MATCH THOSE
CORRESPONDING TO TAG ID RECORDED
IN COMMON DATABASE

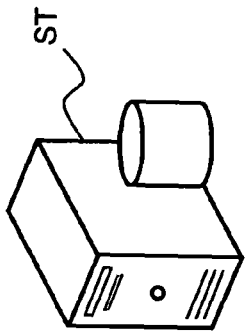
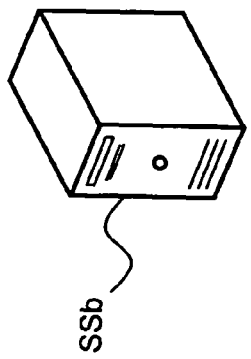

SSb

ST

"<?xml version="1.0" encoding="UTF-8" ?>
<Query-Results>
 <tag id="E00401000A844BF3">
  <title>PROJECTOR OWNED BY
   DEVELOPMENT DIVISION</title>
  <category>ARTICLE MANAGEMENT</category>
  <url>http://buppin-kanri.brother.co.jp/service/</url>
  <user>ichirotanaka</user>
  <group>Development Division, Brother Industries</group>
  <security>true</security>
  <options>
   <name>PROJECTORNo3</name>
   <date>1999.10.10</date>
   <owner>ICHIRO TANAKA</owner>
   <company>ABC MANUFACTURING</company>
   <sonata> · · · </sonata>
  </options>
 </tag>
</Query-Results>"

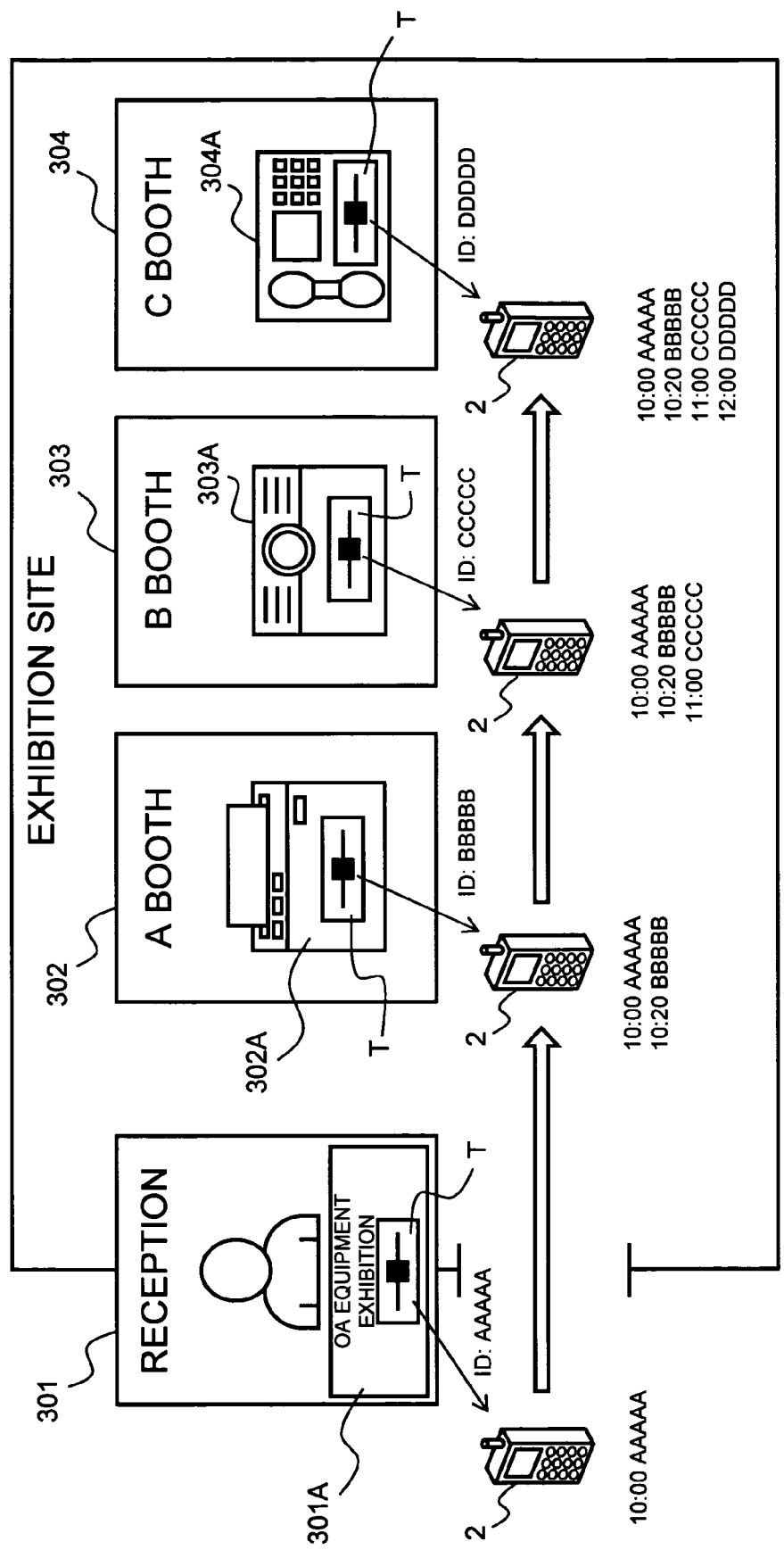
[FIG. 17]

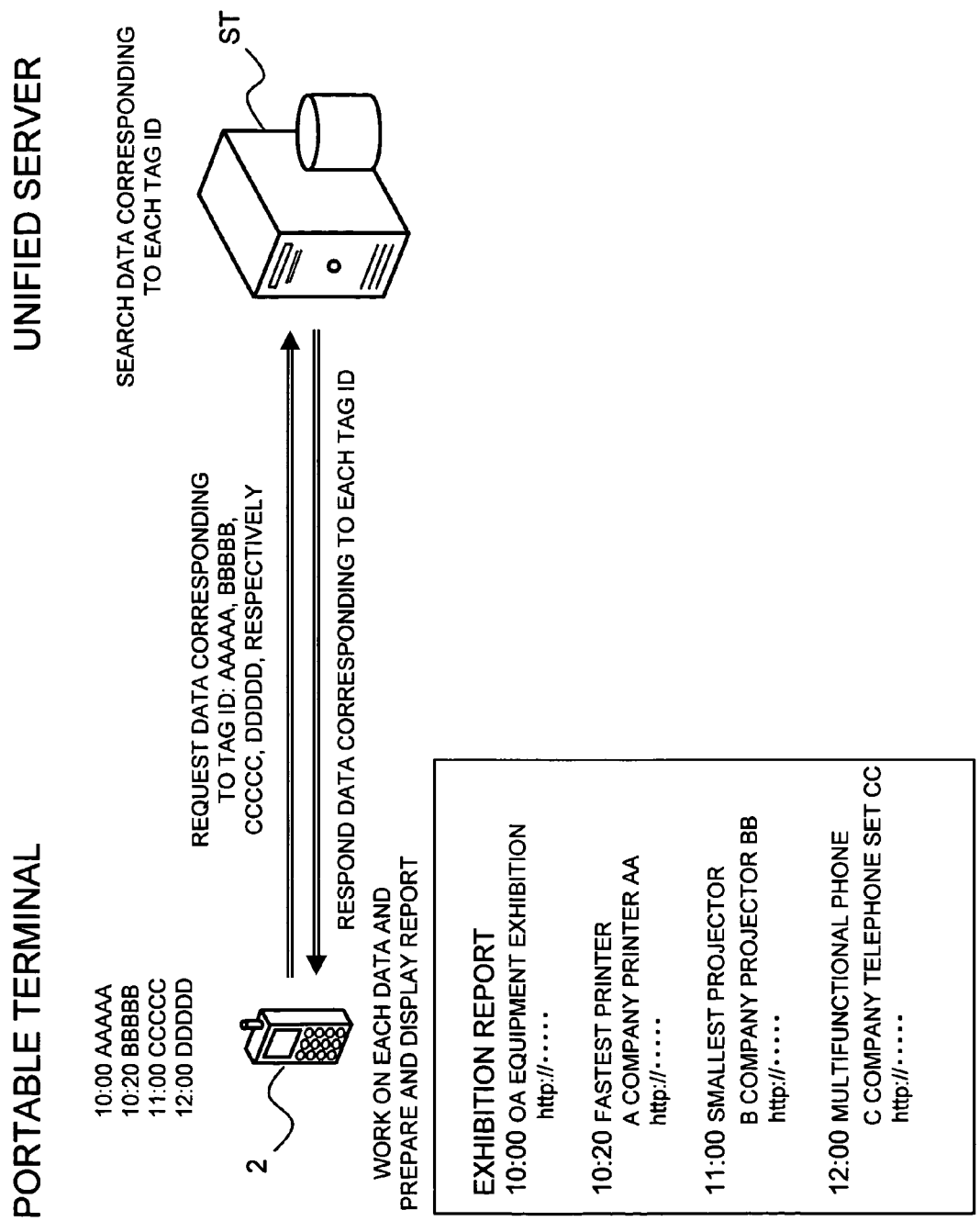

[FIG. 19]

SERVICE SERVER

REQUEST TWO DATA CORRESPONDING TO
TARGET ID: E0040100A72D4B0
E00403000A72D6C3, RESPECTIVELY

UNIFIED SERVER

SEARCH TWO DATA CORRESPONDING
TO TARGET ID: E0040100A72D4B0,
E00403000A72D6C3, RESPECTIVELY

COUPLE AND
RESPOND TWO DATA

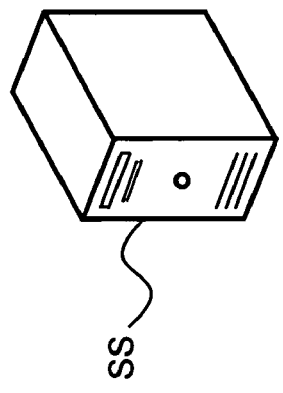

"http://dbserver.brother.co.jp/idQuery"
"tagid=E0040100A72D4B0"
"tagid=E00403000A72D6C3"

"<?xml version="1.0" encoding="UTF-8" ?>
<Query-Results>
<tag id="E0040100A72D4B0">
  <title>OA EQUIPMENT EXHIBITION</title>
  <category>EXHIBITION</category>
  ......
  <options>
    <sonata>····</sonata>
  </options>
</tag>
<tag id="E00403000A72D6C3">
  <title>OA EXHIBITION FASTEST PRINTER</title>
  <category>EXHIBITION</category>
  ......
  <options>
    <sonata>····</sonata>
  </options>
</tag>
</Query-Results>"

SS

ST

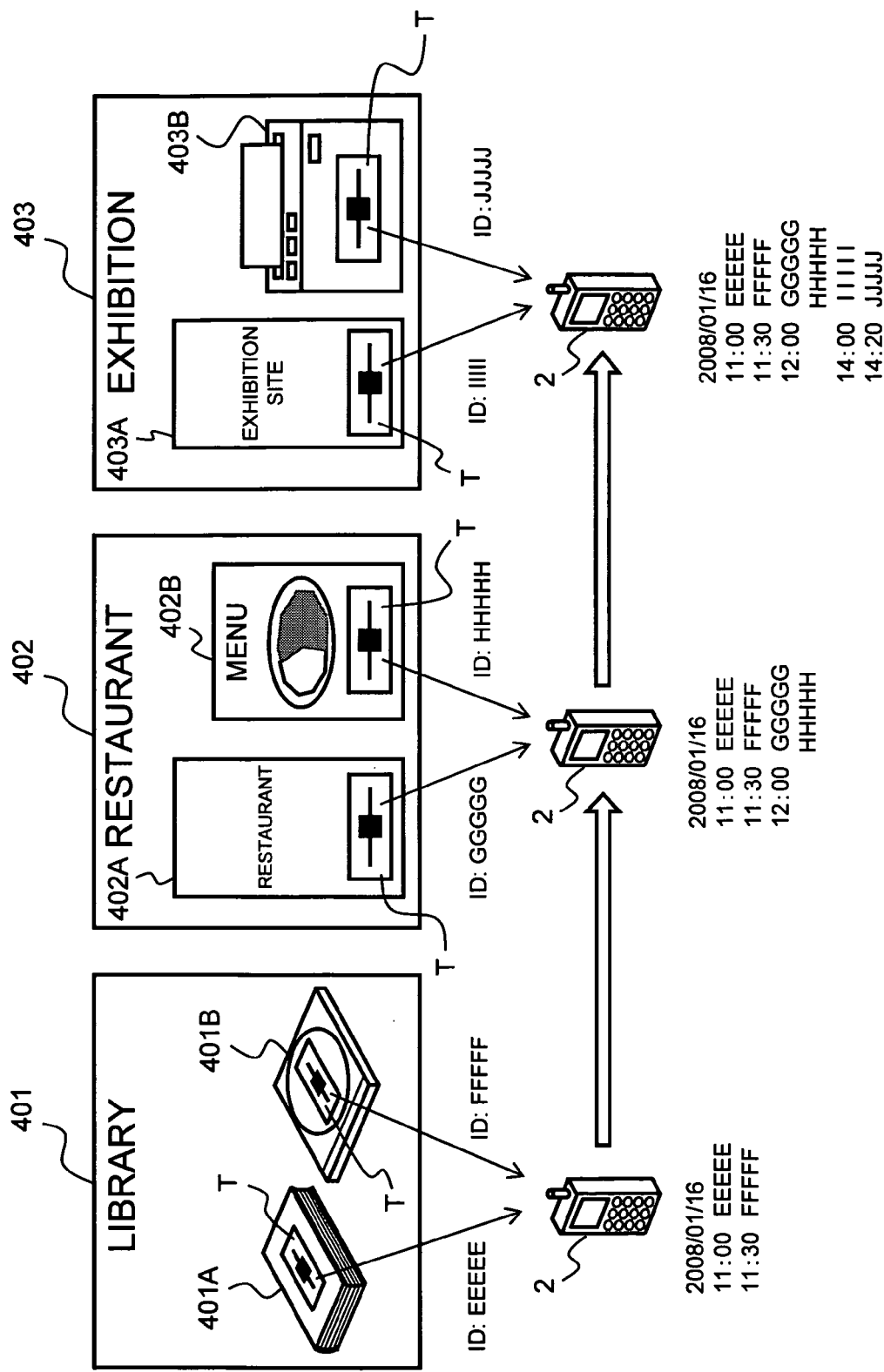
[FIG. 20]

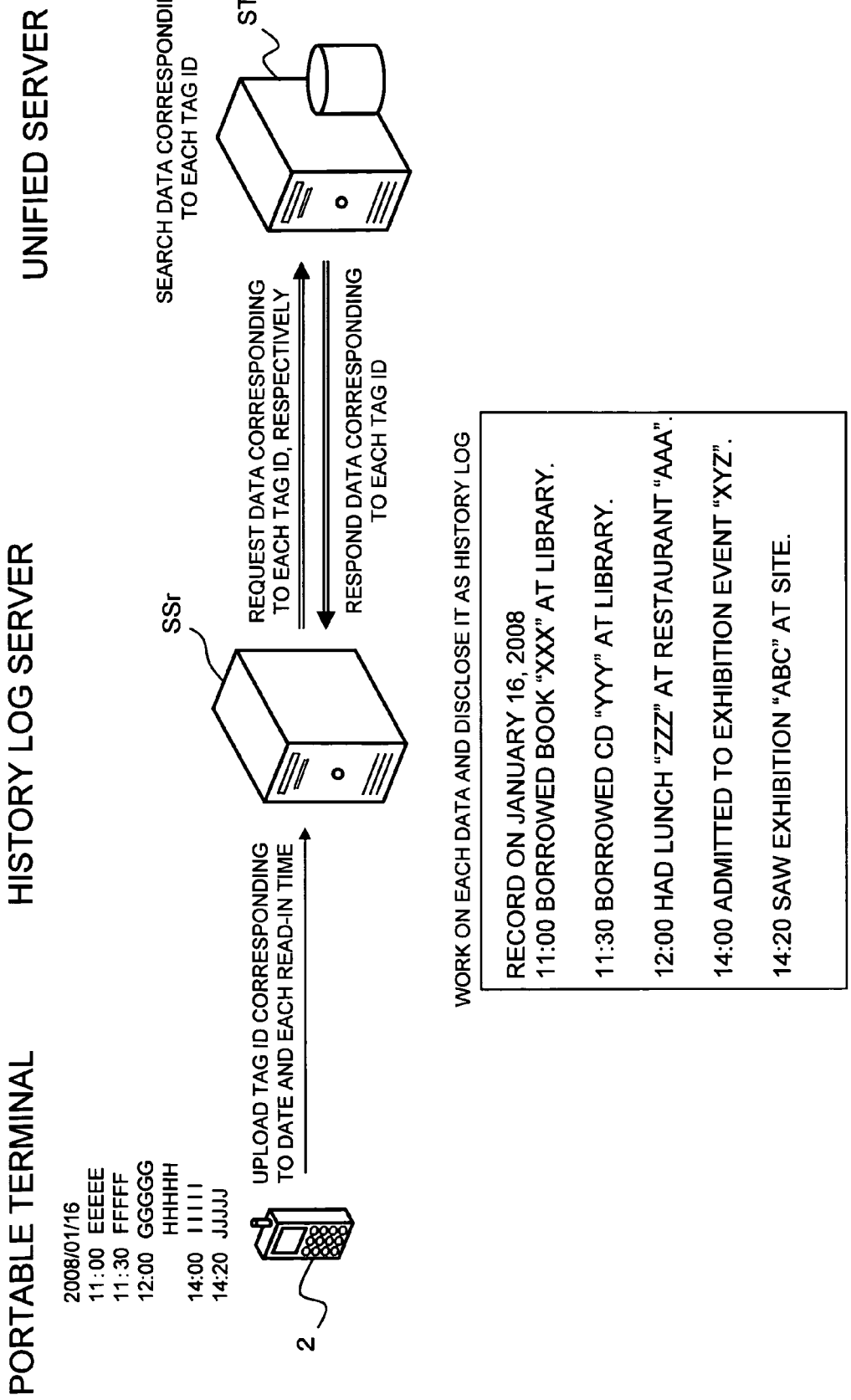

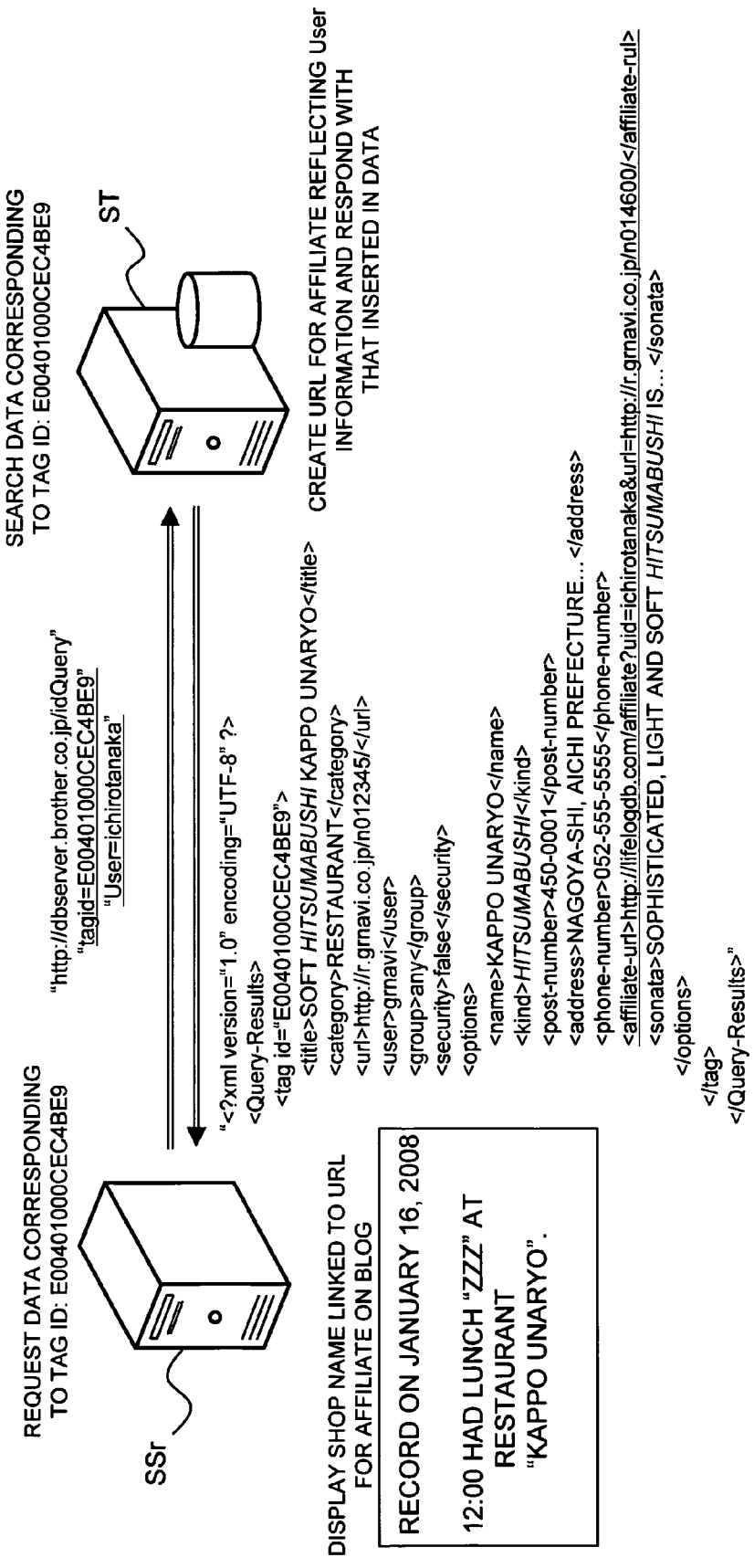
[FIG. 22]

RFID TAG INFORMATION SERVICE SYSTEM

CROSS-REFERENCE TO RELATED APPLICATIONS

This application claims priority from JP 2008-080693, filed Mar. 26, 2008, the contents of which are hereby incorporated by reference.

BACKGROUND OF THE INVENTION

1. Field of the Invention

The present invention relates an information service system that provides various types of information to users using a server.

2. Description of the Related Art

A prior art that provides services by individual applications using a plurality of service servers is described in JP,A,2005-149174, for example.

With the information service system (service providing system) in the prior art, as a service server (service managing device) that manages respective corresponding services, a point managing device, a campaign managing device, and a promotion item providing managing device are provided. The managing devices are connected to each other via a wired or radio communication line.

The point managing device includes a point management database storing personal information of users according to service in association with ID numbers of the users and manages point service to be given to the users. The campaign managing device includes a campaign management database storing personal information according to service such as accumulated purchase quantity indicating the total number of purchases of campaign items in association with the ID numbers of the users and manages campaign service to be provided to the users. The promotion item providing managing device includes a promotion item providing management database storing personal information according to service such as service use histories of the users in association with the ID numbers of the users and manages promotion item providing service to be provided to the users.

In the above prior art, specific application is used for each service server corresponding to each service, and a corresponding individual database is provided. In such a case, a specific data format is usually used for each application of service. Therefore, if the plurality of applications is to be used in a transverse manner by a terminal device, for example, an interface considering specific data structures and table structures of each service is required. Thus, if the transverse use is assumed, a need to change the data format handled in each application arises or development of the application for each service is restricted, which results in difficulty in efficient application development.

SUMMARY OF THE INVENTION

The present invention has an object to provide an information service system that can promote efficient application development.

BRIEF DESCRIPTION OF THE DRAWING

FIG. 1 is a system configuration diagram illustrating an entire information service system of an embodiment of the present invention.

FIG. 2 is a functional block diagram illustrating detailed functions of a unified server and a portable terminal in the information service system.

FIG. 3 is a functional block diagram illustrating detailed functions of a service server and an apparatus for producing a RFID tag in the information service system.

FIG. 4 is a block diagram illustrating an example of functional configuration of a RFID circuit element provided at a RFID tag.

FIG. 5 is a diagram conceptually explaining an information flow and its processing around a library collection management server provided in the information service system.

FIG. 6 is a diagram illustrating book data described in the XML format.

FIG. 7 is a diagram conceptually explaining the information flow and its processing around a restaurant search server provided in the information service system.

FIG. 8 is diagram illustrating shop data written in an XML format.

FIG. 9 is a diagram conceptually explaining the information flow and its processing around a portable terminal.

FIG. 10 is a diagram illustrating an example of a situation in which tag IDs are read and collected using the portable terminal.

FIG. 11 is a sequence diagram illustrating an example of a control operation and a response of the service server, the portable terminal, and the unified server from production of a RFID tag to acquisition of data.

FIGS. 12A and 12B are diagrams conceptually explaining the information flow and its processing in a search function of a restaurant search server.

FIGS. 13A and 13B are diagrams conceptually explaining the information flow and its processing in a search function of a library collection management server.

FIGS. 14A and 14B are diagrams conceptually illustrating examples of a table for restaurant search server and a table for library collection management server, respectively.

FIG. 15 is a diagram conceptually explaining the information flow and its processing when the unified server searches a restaurant through the restaurant search server.

FIG. 16 is a diagram for explaining a variation in which security information is included in a data request signal from an article management server and transmitted.

FIG. 17 is a diagram illustrating an example of a situation in which tag IDs are read and collected in a variation in which a memo is created using the portable terminal.

FIG. 18 is a diagram conceptually explaining the information flow and its processing between the portable terminal and the unified server when the memo is created by the example shown in FIG. 17.

FIG. 19 is a diagram conceptually explaining the information flow and its processing of a variation in which a plurality of tag IDs is processed collectively.

FIG. 20 is a diagram illustrating an example of a situation in which the tag IDs are read and collected in a variation in which a blog is created using the portable terminal.

FIG. 21 is a diagram conceptually explaining the information flow and its processing among the portable terminal, a blog server, and the unified server when a blog is to be created by the example shown in FIG. 20.

FIG. 22 is a diagram conceptually explaining the information flow and its processing of a variation in which a URL for affiliate is linked to the blog.

DETAILED DESCRIPTION OF THE PREFERRED EMBODIMENTS

An embodiment of the present invention will be described below referring to the attached drawings.

FIG. 1 is a system configuration diagram illustrating an entire information service system of the embodiment.

An information service system 1 shown in FIG. 1 comprises a RFID tag T storing information, a portable terminal (terminal device) 2 having a tag reading function that reads out information from the RFID tag T via radio communication, a wireless phone function capable of a call and information transmission/reception by connecting to a telephone line via radio communication, and an information processing function capable of information processing by executing an application, a plurality of service servers SS that provide different types of services by individual applications to clients (service terminals; terminal constituted by a general-purpose computer) 3, respectively, connected through a network, and a single unified server ST that connects to the portable terminal 2 and the service server SS through the telephone line and the network and can transmit/receive information. Further, an apparatus 4 for producing a RFID tag configured to produce the RFID tag T is connected to an appropriate one with necessity among the plurality of service servers SS (may be connected to the client 3).

As a format of information transmitted/received between these devices, first, the plurality of service servers SS transmit/receive data (lower rank data) in a specific interface format suitable for providing respective services in a so-called WEB application form with respect to the client 3, for example. On the other hand, the unified server ST transmits/receives data (higher-rank data) in a common interface format corresponding to the XML (Extensible Markup Language) format with respect to the plurality of service servers SS. The unified server also transmits/receives data in the common interface format corresponding to the XML format with respect to the portable terminal 2. (Each interface format and the higher rank data/lower-rank data will be described later in detail).

In the RFID tag T, specific identification information uniquely defined without duplication (tag identification information; hereinafter referred to as tag ID) is stored. The portable terminal 2 can read out the tag ID from the RFID tag T by means of the tag reading function.

FIG. 2 is a functional block diagram illustrating detailed functions of the unified server ST and the portable terminal 2 in the information service system 1.

In FIG. 2, the unified server ST is connected to the plurality of service servers SS and a relay station 11 (that carries out radio communication with the portable terminal 2) through a wide-area network NW such as the Internet. Also, each service server SS is connected to the client 3 through the wide-area network NW such as the Internet or the local network NL such as LAN according to the respective use forms.

The unified server ST comprises a CPU (central processing unit) 12, a memory 13 made of a RAM, a ROM and the like, for example, an operation portion 14 to which an instruction and information are input from a system administrator, a display portion 15 that displays various information and messages, a large-capacity storage device 16 made up of a hard disk device and functioning as a common database in which a tag ID of the RFID tag T and data associated with that (which will be described later in detail) are stored, and a network communication control portion (first transmission/reception portion) 17 that controls transmission/reception of an information signal with the portable terminal 2 (via the relay station) and the service server SS via the wide-area network NW.

The CPU 12 of the unified server ST carries out signal processing according to a program stored in advance in the ROM while using a temporary storage function of the RAM, and thereby various information signals are transmitted/received with the portable terminals 2 and the service servers SS.

The portable terminal 2 is constituted by a portable terminal main body 21, a main antenna 22 that carries out radio communication with the wide-area network through the relay station 11, and a reader antenna (built in the portable terminal main body in the example of the portable terminal shown in FIG. 1 and the like) 23 that carries out the radio communication with the RFID tag T.

The portable terminal main body 21 comprises a CPU 31, a memory 32 similar to the above, an operation portion 33, a display portion 34, a data transmission/reception portion (fourth transmission/reception portion) 35 that carries out transmission/reception of an audio signal of a call and a data signal through the main antenna 22, and a tag reader (information acquisition device) 36 that reads out the tag ID from the RFID tag T through the reader antenna 23.

An example in which the portable terminal 2 is connected to the unified server ST via the wide-area network NW (Internet) constituted by a wireless telephone line through the relay station 11 is shown, but other than that, the terminal may be connected via the wide-area network NW through a wireless LAN and the like, and in this case, the terminal may be specialized in an information communication function that transmits/receives only a data signal by excluding the telephone function for transmission/reception of an audio signal of a call from the portable terminal 2.

The RFID tag T has a RFID circuit element To provided with a tag antenna 151 and an IC circuit part 150, and the RFID circuit element To is provided on a base material, not particularly shown (the RFID circuit element To will be described later in detail).

FIG. 3 is a functional block diagram illustrating detailed functions of the service server SS and the apparatus 4 for producing a RFID tag in the information service system 1.

In FIG. 3, in the illustrated example, the service server SS is connected to the apparatus 4 for producing a RFID tag configured to produce the RFID tag T and provides a service to produce the RFID tag T upon an instruction input through the operation portion 42 and the instruction input from the client 3 through the local-area network NL such as LAN.

The service server SS comprises a control circuit 41 including a CPU and a memory, an operation portion 42, a display portion 43, a storage device 44 that stores various types of information suitable to services to be provided in a table format corresponding to the tag ID of the RFID tag T (See FIG. 14, which will be described later), an higher-rank network control portion (second transmission/reception portion) 45 that controls higher-rank data transmission/reception with the unified server ST via the wide-area network NW, a lower-rank network control portion (third transmission/reception portion) 46 that controls lower-rank data transmission/reception with the client 3 via the local-area network NL, and a communication control portion 47 that carries out control of communication with the apparatus 4 for producing a RFID tag.

If the service server SS provides services such as a search service and a blog disclosure service to the client 3, for example, the tag ID of the RFID tag T and information corresponding thereto are stored in an appropriate format suitable for the service in the storage device 44, and the service server SS is connected to the client 3 through the wide-area network NW such as the Internet.

On the other hand, the apparatus 4 for producing a RFID tag has a holder portion 210 for a roll of a tape with RFID tags to which a roll 204 of a tape with RFID tags can be detachably attached (or a cartridge provided with the roll 204 of a tape with RFID tags can be detachably attached) around which a tag tape 203 provided with the RFID circuit elements To with a predetermined interval (actually it is wound in the spiral state but simplified and shown with a concentric circle) is wound, a print head 205 configured to make a desired print on a region corresponding to the RFID circuit element To in the tag tape 203 fed out of the roll 204 of a tape with RFID tags, an apparatus antenna 206 configured to carry out transmission/reception of information via radio communication with the RFID circuit element To, a radio frequency circuit 201, a control circuit 202, a communication control portion 208 configured to control communication with the service server SS, a cutter 207 configured to cut the tag tape 203 for which print on the tag tape 203 and the information writing in the RFID circuit element To have been finished to a predetermined length to produce the RFID tag T, and a feeding device 209 provided opposite to the print head 205 and configured to feed the roll 204 of a tape with RFID tags under control of the control circuit 202.

The radio frequency circuit 201 and the control circuit 202 create access information to the IC circuit part 150 of the RFID circuit element To, transmit it to the RFID circuit element To via the apparatus antenna 206 and read the information from or write the information in the IC circuit part 150 of the RFID circuit element To. The control circuit 202 is connected to the service server SS via the communication control portion and is capable of information transmission/reception with the service server 3 (may be also capable of direct information transmission/reception with the client 3 as mentioned above).

In such a configuration, when the RFID tag T is to be produced by the apparatus 4 for producing a RFID tag, an operator operates an appropriate operation device provided at the client 3 (or the service server SS) so as to input setting of print information and the like to be printed on the surface of the RFID tag T and to input a production instruction of the RFID tag T. On the basis of the production instruction, by means of the control of the control circuit 41 of the service server SS and the control circuit 202 of the apparatus 4 for producing a RFID tag, the print is made by the print head 205 on the basis of the setting input information, and the access information is created by the radio frequency circuit 201 and transmitted to the RFID circuit element To via the apparatus antenna 206. As a result, information is read from or written in the IC circuit part 150 of the RFID circuit element To, and the RFID tag T provided with the corresponding tag ID is produced.

FIG. 4 is a block diagram illustrating an example of functional configuration of the RFID circuit element To provided at the RFID tag T.

In FIG. 4, the RFID circuit element To has the tag antenna 151 configured to transmit/receive a signal contactlessly via radio communication or electromagnetic induction with the reader antenna 23 of the portable terminal 2 as mentioned above and the IC circuit part 150 connected to the tag antenna 151.

The IC circuit part 150 has a rectification part 152 configured to rectify an interrogation wave received by the tag antenna 151, a power source part 153 configured to accumulate energy of the interrogation wave rectified by the rectification part 152 so as to make it a driving power source, a clock extraction part 154 configured to extract a clock signal from the interrogation wave received by the tag antenna 151 and to supply it to a control part 157, a memory part 155 that can store predetermined information signals, a modem part 156 connected to the tag antenna 151, and the control part 157 configured to control operation of the RFID circuit elements To through the memory part 155, the clock extraction part 154, the modem part 156 and the like.

The modem part 156 demodulates a communication signal from the reader antenna 23 of the portable terminal 2 received by the tag antenna 151 and modulates a reply signal from the control part 157 and transmits it as a response wave (signal including the tag ID) from the tag antenna 151.

The clock extraction part 154 extracts a clock component from a received signal, extracts a clock to the control part 157 and supplies a clock corresponding to a frequency of the clock component of the received signal to the control part 157.

The control part 157 executes basic control such as interpretation of a received signal demodulated by the modem part 156, generation of a reply signal based on the information signal stored in the memory part 155, return of the reply signal by the modem part 156 from the tag antenna 151 and the like.

A flow of information and its processing in the information service system 1 of this embodiment will be described below in detail.

(A) Production of RFID Label

First, the flow of information and its processing when a RFID tag T is to be produced upon an instruction from the client 3 will be described based on an example of two different service servers SS.

FIG. 5 is a diagram for conceptually explaining the flow of the information and its processing around the service servers in a first example provided at the information service system 1 of this embodiment. In FIG. 5, a service server SSz in the first example is a library collection management server SSz providing a management service of a collection in a library.

The library collection management server SSz is provided with a general search function and a RFID tag production function. The search function is to search a book satisfying a desired condition when the client 3 accesses the library collection management server SSz via the local-area network NL in a library and to obtain its detailed information (See FIG. 13, which will be described later). The RFID tag production function is a function to produce a RFID tag T to be affixed to a book when a book to be newly managed is to be added. This function will be described below in detail.

In the example shown in FIG. 5, first, a user of the client 3 inputs detailed data (book data in this example) relating to the book to be newly added ("Illustrated Information Theory" in this example. The same applies to the following.) and performs an operation to instruct new production of a RFID tag T along with that. This book data is data including predetermined items ("book name: Illustrated Information Theory, URL:=with many illustrations . . . " in the illustrated example) specified by the library collection management server SSz, that is, low-level data corresponding to a specific interface format.

By means of the above operation, the client 3 transmits an instruction signal instructing production of the RFID tag T with the input book data to the library collection management server SSz. The library collection management server SSz having received it transmits a tag ID ("E01101000F635BD7" in the illustrated example) set and created as appropriate in association with the received book data and an instruction signal to instruct production of the RFID tag T to the apparatus 4 for producing a RFID tag. Though the setting and creation of the tag ID is not particularly described in detail, it may be set and created from a plurality of tag IDs allocated in advance by the library collection management server SSz itself, or the unified server ST may manage the tag IDs in a centralized manner and allocate one upon request by the library collection management server SSz.

The apparatus 4 for producing a RFID tag having received the instruction signal produces a RFID tag T by recording the tag ID included in the instruction signal on a RFID circuit element To of the tag tape 203 and printing and cutting it (See FIG. 3). When the production is completed, a production completion signal is transmitted to the library collection management server SSz. After receiving the production completion signal, the library collection management server SSz bundles the book data previously received from the client 3 with the tag ID used for the production of the RFID tag T and converts them from the low-level data format to a higher-rank data format. Then, the server SSz transmits the higher-rank data to the unified server ST in a common interface format (so as to be registered).

Here, the higher-rank data is data written in the XML format and in this example, it is similarly written in the XML format and configured such that basic items required for transmission/reception between the service server SS (the library collection management server SSz in this example) and the unified server ST are added to the detailed items corresponding to the contents input at the client 3 in this example (the XML format will be described in detail in FIG. 6, which will be described later). The processing of conversion from the low-level data to the higher-rank data by the library collection management server SSz (service server SS) is called data format conversion processing (the same applies to the case of reverse conversion as will be described later). Also, the format for transmission/reception of the higher-rank data between the unified server ST and each service server SS is common among all the service servers SS, that is, this is the communication in the common interface format corresponding to the XML format.

The unified server ST having received this higher-rank data registers the received higher-rank data in a common database (not particularly shown) constituted in the large-capacity storage device 16 of itself. Here, since the tag ID is included in the book data itself in this higher-rank data format and can be referred to, the book data is registered in association with the tag ID.

FIG. 6 is a diagram for explaining the higher-rank data written in the XML format and shows an example of the book data shown in FIG. 5.

The so-called XML here is one of markup languages for describing semantics and structures of documents and data, and as shown in FIG. 6, description is made structurally using specific character string (so-called "XML tag") between an indicator surrounded by "<" and ">" and an indicator surrounded by "</" and ">" as a basic unit.

In FIG. 6, "<tag id="E01101000F635BD7">" indicates the tag ID and the entire description between the character string "<tag id="E01101000F635BD7">" and the character string "</tag>" constitutes single book data of the contents corresponding to the tag ID "E01101000F635BD7". Also, a group of character strings between the character string "<title>" and the character string "</security>" constitutes the basic items (common data items), and a group of character strings between the character string "<option>" and the character string "</option>" constitutes the detailed items (specific data items).

The basic items are, as mentioned above, a group of the character strings required for transmission/reception between the unified server ST and each service server SS, and the type of included character strings is set in common for all the higher-rank data transmitted/received between the unified server ST and each service server SS. On the other hand, the detailed items are a group of the character strings indicating the detailed contents of each individual data, and the type and the number of included character strings, that is, the items of the information contents are set freely for each type of corresponding articles (books in this example). In the illustrated example, other than the character string of "<name>" indicating the name and the character string of "<sonata>" indicating explanation, featuring character strings are set as information relating to the book such as the character string of "<author>" indicating the author and the character strings indicating name, location, contact of the publisher as shown in A01 in the figure.

FIG. 7 is a diagram for conceptually explaining the flow of the information and its processing around the service server in a second example provided at the information service system 1 of this embodiment. In FIG. 7, a service server SSi of the second example is a restaurant search server SSi providing a search service of information relating to restaurants.

The restaurant search server SSz is provided with a general search function and a RFID tag production function. The search function is to search a restaurant satisfying a desired condition when the client 3 accesses the restaurant search server SSi via the wide-area network NW, for example, and to obtain its detailed information (See FIG. 12, which will be described later). The RFID tag production function is a function to produce a RFID tag T to be affixed to a shop (at an entrance or a signboard, for example) when the shop to be searched is to be added. This function will be described below in detail.

In FIG. 7, a difference from the case of the library collection management server SSz shown in FIG. 5 is that the data input from the client 3 is shop data ("shop name: KAPPO UNARYO, URL:~HITSUMABUSHI IS . . . " in the illustrated example) relating to a shop of a restaurant ("KAPPO UNARYO" in the illustrated example), and a corresponding tag ID ("E00401000CEC4BE9" in the illustrated example) is different.

FIG. 8 shows the higher-rank data including the shop data shown in FIG. 7.

In FIG. 8, the character strings set in the detailed items include not only the character string of "<name>" indicating the shop name and the character string of "<sonata>" indicating explanation but also featuring character strings set as shop information of the restaurant such as the character string of "<kind>" indicating the handled item of the shop and the character strings indicating location, contact as shown in A02 in the figure. When the configuration of the higher-rank data and the character strings including the book data shown in FIG. 6 is compared, only the items of the character strings in A01 and A02 in the detailed items are different and the others have substantially the same character string configuration on the whole.

As mentioned above, since the advantage of writing the higher-rank data in the XML format is characterized in that the user can specify a unique tag, the character string items in the detailed items can be set with a high degree of freedom according to the type of the articles to be managed/searched (book, shop in this example) as in A01 and A02 shown in FIGS. 6, 8, while even a large number of the higher-rank data with different character string items in the detailed items as above can be stored/managed by a single common database (unified server ST) in a centralized manner. The so-called XML database is constructed by the common database storing data in the XML format as above.

(B) Information Read-Out from RFID Label

Subsequently, the flow of information and its processing of the portable terminal 2 provided at the information service system 1 of this embodiment will be described.

FIG. 9 is a diagram conceptually explaining the flow of information and its processing around the portable terminal 2. In this figure, the example in FIGS. 5 and 6 among the examples shown in FIGS. 5 to 8, that is, an example in which the user of the portable terminal 2 reads out the tag ID from the RFID tag T affixed to a book in the library and directly obtains the book data corresponding to the tag ID from the unified server ST is shown.

In FIG. 9, first, when the user of the portable terminal 2 carries out a predetermined operation by moving the portable terminal 2 closer to the RFID tag T affixed to the book, the tag reader 36 inside the portable terminal 2 reads out the tag ID through the reader antenna 23. Then, the portable terminal 2 accesses the unified server ST through URL reflecting the tag ID and transmits a request signal (inquiry signal including the tag identification information) requesting the book data in the common interface format. The unified server ST having received it detects the book data corresponding to the tag ID and transmits it in the common interface format to the portable terminal 2. Then, the portable terminal 2 displays the received data (or a part thereof) on the display portion 34. As a result, the user of the portable terminal 2 can check the book data.

Note that information read-out can be performed by the portable terminal 2 not only for the books stored in a library as above but also for the books on shelves in a book shop. In this case, too, similar to the above, the unified server ST is accessed through the URL reflecting the tag ID so as to obtain the book data. In this case, there is an effect that the book data (or a part or the whole of the information of descriptions, which are the contents of the book) can be obtained later only by carrying out read-out of the RFID tag T and obtaining the tag ID even without opening the book at the book shop.

Though not particularly shown, the user of the portable terminal 2 can similarly obtain shop data easily for a shop in the example shown in FIGS. 7 and 8, that is, for the tag ID read out of the RFID tag T of a restaurant 402.

FIG. 10 is a diagram illustrating an example in which the tag IDs of the RFID tag T of the book and the RFID tag T of the restaurant are read out and accumulated by the single portable terminal 2. In the example shown in FIG. 10, the holder of the portable terminal 2 visits a library 401 and the restaurant 402 in this order and reads out the tag IDs at each spot using the portable terminal 2.

In the illustrated example, first, the holder of the portable terminal 2 reads out the tag ID ("E01101000F635BD7" in the illustrated example) from the RFID tag T affixed to a book 401A borrowed from the library 401 (affixed by the procedure explained using FIG. 5). After that, the holder reads out the tag ID ("E00401000CEC4BE9" in the illustrated example) corresponding to the shop from the RFID tag T affixed to a signboard 402A at the subsequent restaurant 402 (affixed by the procedure explained using FIG. 7). Then, read-out tag IDs are recorded and accumulated in the portable terminal 2 in association with the time of read-out, respectively. Therefore, by making an inquiry at the unified server ST from the portable terminal 2 using these two tag IDs, the book data and the shop data corresponding to the tag IDs can be obtained as above, and the holder can check them.

The data corresponding to different types of articles can be obtained through the single portable terminal 2 as above since all the data is collectively managed by the unified server ST in the common interface format corresponding to the XML format, that is, the portable terminal 2 shares all the data with all the service servers SS. As a result, the portable terminal 2 can obtain and use all the data handled by any type of service server SS in a transverse manner.

(c) Summary from Production of RFID Label to Information Read-Out

FIG. 11 is a sequence diagram illustrating an example of a control operation and response of the service server SS (book is a management target in this example), the portable terminal 2, and the unified server ST in a process from production of the RFID tag T to obtainment of data using that. In FIG. 11, time series is changed from the upper side to the lower side in the figure, and procedures of the portable terminal 2, the service server SS provided with the apparatus 4 for producing a RFID tag, and the unified server ST relating to the time series are illustrated and a relation of them in the time series will be described.

First, in a procedure SS1 of the service server SS, the user inputs book data on a book from the client 3, input through the operation device of the client 3. The book data is still low-level data in the specific interface format at this time.

After that, in a procedure SS2, a signal to instruct production of the RFID tag T including the tag ID is transmitted to the apparatus 4 for producing a RFID tag, and the RFID tag T storing the tag ID is produced. The RFID tag T is affixed to a book B corresponding to the tag ID stored by itself.

When a production completion signal (not particularly shown) is received from the apparatus 4 for producing a RFID tag, the service server SS bundles the book data in the lower-lank data format with the tag ID and converts it (that is, writes in the XML format corresponding to the tag ID) to an higher-lank data (=data format conversion processing portion) in a procedure SS3.

Then, in the subsequent procedure SS4, the book data in the higher-lank data format including the tag ID is transmitted in the common interface format to the unified server ST. The unified server ST having received it registers the received book data in the common database in a procedure TS1.

On the other hand, the portable terminal 2 reads out the tag ID from the RFID tag T affixed to the book, accesses the unified server ST through the URL reflecting the tag ID in the subsequent procedure KS2 (that is, access in the common interface format) and requests the book data. The unified server ST having received that detects, in a procedure TS2, the book data corresponding to the tag ID registered in the procedure TS1 and transmits it in the common interface format to the portable terminal 2 in the subsequent procedure TS3. Then, the portable terminal 2 displays the received book data (or a part thereof) in the higher-lank data format on the display portion 34 in a procedure KS3.

(D) Search Function of the Service Server

Note that the client 3 can receive service using the search function of the service server SS. The information flow and its processing in this case will be described on the basis of the above-mentioned examples of the restaurant search server SSi and the library collection management server SSz, respectively.

FIGS. 12A and 12B are diagrams conceptually explaining the information flow and its processing when the search function of the restaurant search server SSi is used. First, in FIG. 12A, the user of the client 3 specifies a condition of a location ("around Nagoya station" in the illustrated example) and a condition of a menu item ("Hitsumabushi" in the illustrated example) and requests the restaurant search server SSi to search a restaurant satisfying these conditions (keys).

The restaurant search server SSi having received the request detects a shop name ("Kappo Unaryo" in the illustrated example) satisfying the specified conditions from a table for restaurant search server (See FIG. 14A, which will be described later) stored in the storage device 44 of itself as a search result. The restaurant search server SSi responds to the client 3 with the "shop name: Kappo Unaryo" as the search result, and the client 3 having received the response displays it as it is so that the user of the client 3 can check the search result of the restaurant satisfying the specified conditions.

Subsequently, when the user of the client 3 performs an operation to request shop data on the shop "Kappo Unaryo", as shown in FIG. 12B, the client 3 transmits an instruction signal to request the shop data of the shop "Kappo Unaryo" to the restaurant search server SSi. The restaurant search server SSi having received the request obtains the tag ID corresponding to the shop "Kappo Unaryo" from a table for the restaurant search server (See FIG. 14A, which will be described later). This tag ID corresponds to the RFID tag T already issued to the shop "Kappo Unaryo" through the procedures explained using FIGS. 7 and 8.

The restaurant search server SSi accesses the unified server ST through the URL (if the wide-area network NW is the Internet) reflecting the tag ID and requests the shop data corresponding to the tag ID in this example. Incidentally, the format to request the shop data to the unified server ST by accessing it through the URL reflecting the tag ID as above is also communication in the common interface format (corresponding to the XNL format). The unified server ST having received the request by the common interface detects the shop data (higher-lank data. Already registered and stored at the above-mentioned issuance of the RFID tag T) corresponding to the tag ID from the common database in the large-capacity storage device 16 of itself and responds to the restaurant search server SSi.

Then, the restaurant search server SSi converts the received shop data (or a part thereof) of the higher-lank data to the specific data format of the lower-lank data ("shop name: Kappo Unaryo, URL:~Hitsumabushi is~" in the illustrated example) and responds to the client 3 with this in the specific interface format. The client 3 having received it displays the data, and thereby the user of the client 3 can check the shop data of the requested restaurant.

FIGS. 13A and 13B are diagrams conceptually explaining the information flow and its processing when the search function of the library collection management server SSz is used. In FIGS. 13A and 13B, a difference from the case of the restaurant search server SSi shown in FIGS. 12A and 12B is that, as shown in FIG. 13A, in response to the book search request from the client 3, the library collection management server SSz searches a book satisfying the specified conditions ("Illustrated Information Theory" in the illustrated example) and also detects and responds various types of information required for management of the book ("(management number:) IT0123", "(storage position:) T1 bookshelf, upper shelf" in the illustrated example). The information required for the management is information uniquely set by the library and can not be obtained from the common database of the unified server ST storing only the information on the book itself. That is, the library collection management server SSz can provide service specialized in book management.

When the user of the client 3 performs the operation to request the book data on the book "Illustrated Information Theory" to the library collection management server SSz as shown in FIG. 13B, similarly to the case of the restaurant search server SSi shown in FIG. 12B, the library collection management server SSz obtains the tag ID corresponding to the book "Illustrated Information Theory" from the table for library collection management server (See FIG. 14B, which will be described later). This tag ID corresponds to the RFID tag T already issued to the book "Illustrated Information Theory" by the procedures explained using the FIGS. 5 and 6.

Then, the library collection management server SSz accesses the unified server ST through the URL reflecting the obtained tag ID and requests the book data. Similarly to the above, the format accessing the unified server ST through the URL reflecting the tag ID and requesting the book data is communication in the common interface format (corresponding to the XNL format). The unified server ST having received the request detects the book data (higher-lank data. Already registered and stored at the above-mentioned issuance of the RFID tag T) corresponding to the tag ID and transmits it to the library collection management server SSz. Then, the library collection management server SSz converts the received higher-lank data to the lower-lank data ("book name: Illustrated Information Theory, URL:~illustrate easily to be understood . . . " in the illustrated example) and responds to the client 3.

FIG. 14A is a diagram illustrating an example of the table for restaurant search server provided at the restaurant search server SSi, and FIG. 14B is a diagram illustrating an example of the table for library collection management server provided at the library collection management server SSz. Between the service servers SS using the largely different tables, respectively, data handled by each of them is not compatible and is processed within each service server SS in a usual case. However, in this embodiment, each of the plurality of service servers SS with different services to be provided includes a function of data format conversion processing between the higher-lank data format written in the above XML format and the lower-lank data format, which is a specific format. As a result, the data to be managed/searched by each service server SS can be all managed by the unified server ST collectively (in the higher-lank data, that is, the XML data format). Though not particularly shown, if the type of management/search targets to be handled (in this case, the type as book) is the same between the service servers SS as with the search server in the library and the search server in a book shop, for example, the book data of the same book can be also shared in the common database.

As mentioned above, in this embodiment, by concentrating data in the common database provided at the unified server ST, accessing the common database using the common interface, and by making a search using the tag ID as a key, the data corresponding to the tag ID can be obtained. As a result, the database can be made capable of handling any of the individual applications of service servers SS and the applications of the portable terminal 2 and the like. As a result, there is no need to consider the specific data structure and table structure, respectively, as in the case in which there is a database recoding data for each application of each service server SS and there is no more need to change the format of the data to be handled for each application, it becomes easier to develop applications (particularly the application of the portable terminal 2), which can make development more efficient. Also, there is an effect that application development with various applications integrated and the applications reuse can be made easily. Also, extendibility and applicability as a system can be improved particularly by using the general-purpose XML format.

Also, particularly in this embodiment, the higher-lank data in the XML format has the basic items and the detailed items, and the higher-lank data is classified into the basic items in common to the plurality of service servers SS and the detailed items not in common in the higher-lank data transmitted/ received between the plurality of service servers SS and the unified server ST. As a result, smooth and rapid data processing and communication according to the classification are realized, and data processing efficiency and communication efficiency can be improved.

In the above embodiment, if the application of the service server SS has the search function, the service server SS itself is provided with a table for search and searches those satisfying the specified conditions and responds to the client. However, the present invention is not limited to that, but the unified server ST may execute the search processing itself using the common database, for example.

FIG. 15 is a diagram conceptually explaining the information flow and its processing when the unified server searches a restaurant through the restaurant search server. In FIG. 15, the client 3 requests a restaurant search server SS' to search a restaurant using the location condition including "Nagoya" and the menu item condition "Hitsumabusi" as keys.

The restaurant search server SSi' having received it accesses a unified server ST' through the URL reflecting "category=restaurant" as the basic item condition, "address=*Nagoya*" (meaning that "Nagoya" is included in a part of the address" as the location condition, and "kind=Hitsumabushi" as the menu item condition and transmits a request signal requesting restaurant search and shop data corresponding thereto from the common interface format (the Japanese language portion in each condition in the URL should be given consideration of URL encode and the like).

Then, the unified server ST' having received this searches the shop data (XML format higher-lank data) with <category> of "restaurant", <address> of "Nagoya" and <kind> of "Hitsumabushi" from the common database in the large-capacity storage device 16 of itself and responds to the restaurant search server SSi' (See a correlation of underlined portions in the figure). Then, by executing the processing similar to FIG. 12 after that, the user of the client 3 can check the search result of the restaurant satisfying the specified conditions and the shop data corresponding to it.

With such system configuration, there is no need to store a table for search (table for restaurant search server in FIG. 14A) in the storage device 44 of the service server SS (restaurant search server SSi'), and also, search request and display of the detailed data corresponding to the results can be executed easily in a single procedure. Also, if the system configuration is applied to the library collection management server SSz, information specific to the library (information of the table for library collection management server in FIG. 14B, for example) may be also added to each book data, respectively, and stored in the common database of the unified server ST (not particularly shown).

The present invention is not limited to the above embodiments but capable of various modifications in a range not departing from its gist and technical idea. The variations will be described below in order.

(1) When Inquiry is Made with Security Information Incorporated:

Security information may be included in a request signal of data (book data and shop data in the above-mentioned examples) transmitted from the service server SS to the unified server ST on the basis of the operation of the client 3 so that the unified server ST determines success or failure of response of data (higher-lank data) on the basis of a collation result of the security information.

FIG. 16 is a diagram conceptually explaining the information flow and its processing when the security information is included in the request signal for transmission from an article management server SSb, which is another example of the service server SS. In FIG. 16, the article management server SSb managing articles in a company requests the unified server ST for data on an article to be managed ("projector owned by the Development Division" in the illustrated example). At this time, similarly to the above, an access is made to the unified server ST through the URL reflecting the tag ID ("E00401000A844BF3" in the illustrated example), and user information ("User=ichirotanaka" in the illustrated example) and group information ("Group=Development Division, Brother Industries" in the illustrated example) are both transmitted as security information.

At this time, in the common database of the unified server ST, the user information and the group information from which data corresponding to the tag ID is allowed to be obtained are stored in advance. When the unified server ST receives a request signal of the data, first, data corresponding to the tag ID is detected from the common database. Then, it is determined whether or not the received user information and group information match the user information and group information recorded corresponding to the tag ID (as those allowed to obtain data) in the common database. Only when they match the recorded user information and group information, the higher-lank data including the data is returned for response to the article management server SSb. At this time, in the basic items of the higher-lank data returned for response, the character strings reflecting the user information and group information (the character string of "<user>" and the character string of "<group>" in the illustrated example) are described (See a correlation of the underlined portions in the figure) Also, in this case, the contents of the character string of the "<security>" in the basic items become "true".

In the above, the user information in the character string of "<user>", the group information in the character string of "<group>", the character string of the "<security>" and the like constitute security response elements in each claim.

In this variation, if the request signal of data from the article management server SSb does not include the user information and the group information corresponding to the tag ID, the unified server ST does not respond. Therefore, security in information transmission/reception can be improved.

In the above, the case in which the data is requested from the service server (article management server SSb in the above example) to the unified server ST is described as an example, but not limited to that. That is, the present invention may be applied to the case in which the portable terminal 2 requests the unified server ST for data (See FIG. 9) so that the data is requested including the user information similarly to the above and the unified server ST responds in a corresponding mode (including a case of no response. Also, a case in which corresponding data processing as will be described later is included). The similar effect can be obtained in this case, too.

The security information is not limited to the above-mentioned combination of the user information and group information but may be combination of a general login ID and a password, for example. Also, a range to allow data acquisition to single security information may be set. Also, the user information and the group information may be transmitted/ received as reference information to be described simply in the higher-lank data not as the security information determining whether the data can be obtained or not.

(2) When Memo is Created by Application of Portable Terminal:

In the above embodiment, the portable terminal 2 merely individually displays corresponding data each time the tag ID is read out from the RFID tag T affixed to each of the plurality of articles but the present invention is not limited to that. That is, as a function of the application executed by the portable terminal 2, for example, corresponding data may be described together in a time series (=to create a memo) in the plurality of tag IDs read and collected by the portable terminal 2.

FIG. 17 is a diagram illustrating an example of a situation in which the tag IDs are read and collected when a memo is to be created using the portable terminal 2. In order to avoid complexity in the illustration, each tag ID is abbreviated as "ID: AAAAA" and the like (the same applies to the FIGS. 18, 20, 21, which will be described later).

The example shown in FIG. 17 illustrates a case in which the holder of the portable terminal 2 creates a memo on visit to an "OA equipment exhibition" and as a route of the visit, first, the holder enters the site via a reception 301 provided at a site entrance of the "OA equipment exhibition" and takes a look at exhibits one by one in the order of A booth 302, B booth 303, C booth 304 provided in the site, respectively. In the respective activity processes, the tag ID is read out from the RFID tag T affixed to the exhibits using the portable terminal 2. The tag IDs correspond to the RFID tags T already issued to each of the signboard of the exhibition (which will be described later) and the exhibits by a procedure similar to the procedures explained using FIGS. 5, 6, 7, and 8, though detailed description will be omitted.

In the illustrated example, the tag ID corresponding to the exhibition of the "OA equipment exhibition" is read out from the RFID tags T affixed to a signboard 301A on which the name of the exhibition is described and the like at the reception. Also, the tag IDs corresponding to the exhibits are read out from the RFID tags T directly affixed to the exhibits 302A, 303A, 304A exhibited at each booth. Then, the read-out tag IDs are recorded/accumulated in the portable terminal 2 in association with the read-out time, respectively.

FIG. 18 is a diagram conceptually illustrating the information flow and its processing between the portable terminal 2 and the unified server ST when a memo is to be created from the tag IDs read and collected by the example shown in FIG. 17.

In FIG. 18, the portable terminal 2 requests the unified server ST for data corresponding to the plurality of tag IDs read and collected individually in a time series (for data request, see the example shown in FIG. 9). The unified server ST having received it detects data corresponding to each tag ID and transmits it for response to the portable terminal 2 individually. Then, the portable terminal 2 extracts the respective necessary contents from the plurality of received data and displays them in association with time when the tag IDs are read out on the display portion 34, respectively. As a result, the portable terminal 2 can create and display the memo with which the data corresponding to the plurality of tag IDs read and collected is described together in a time series ("exhibition report" in the illustrated example).

As setting of the tag ID in the above example, tag IDs can be set in each stage of the size of classification as an exhibition event, each booth, and exhibits.

Also, if data corresponding to the plurality of tag IDs are requested from the unified server ST as the above case, other than individual transmission of the request signals with each of the plurality of tag IDs, as shown in FIG. 19 (in an example of information transmission/reception between the service server SS and the unified server ST), for example, the plurality of tag IDs may be transmitted collectively in a single request signal. Alternatively, according to this, the unified server ST may return the data corresponding to each tag ID included collectively as single data for response.

In this case, the service server SS makes an access to the unified server ST with a request including the plurality of tag IDs (two tag IDs of "E00401000A72D4B0" and "E00403000A72D6C3" in the illustrated example) as parameters. The unified server ST having received it detects data corresponding to each tag ID, couples the contents (basic items+detailed items) corresponding to each so as to create single higher-lank data (see the underlined portion) and return it to the service server SS for response. As a result, since the plurality of tag IDs can be transmitted to the unified server ST side and the corresponding data can be obtained at once, communication efficiency can be improved. When the portable terminal 2 requests data from the unified server ST, the plurality of tag IDs may be also transmitted similarly to the above. In this case, too, the similar effect is obtained.

(3) When Blog is to be Created by Application of Portable Terminal:

In the variation of the above (2), the memo created on the basis of the plurality of tag IDs read and collected by the portable terminal 2 is displayed only by the portable terminal 2 itself, but not limited to that. That is, it may also be disclosed as a so-called blog which can be widely browsed by anyone through the wide-area network NW.

FIG. 20 is a diagram illustrating an example of a situation in which the tag IDs are read and collected if the blog is to be created using the portable terminal 2. In the example shown in FIG. 20, a case is shown in which the holder of the portable terminal 2 visits the library 401, the restaurant 402, and the exhibition 403 in this order and a so-called blog in which articles relating to the holder at each site are disclosed in a journal format on the network is created. The holder of the portable terminal 2 reads out the tag ID from the RFID tag T affixed to the related articles, respectively, at each site using the portable terminal 2.

In the illustrated example, the tag IDs are read out from the RFID tags T affixed to the book 401A and a CD 401B borrowed at the library 401. After that, the tag IDs corresponding to the shop and the orders are read out from the RFID tags T affixed to the signboard 402A and a menu 402B and the like at the restaurant 402. Moreover, the tag IDs corresponding to the exhibition event itself and exhibits 403B, respectively, are read out from the RFID tags T affixed to the signboard 403A and the exhibits 403B and the like at the exhibition site 403. Then, the read-out tag IDs are recorded/accumulated in the portable terminal 2 in association with the read-out time, respectively.

FIG. 21 is a diagram conceptually explaining the information flow and its processing among the portable terminal 2, a blog server SSr as the service server, and the unified server ST when a blog is to be created from the tag IDs read and collected in the example shown in FIG. 20.

In FIG. 21, by means of an appropriate operation by the holder, the portable terminal 2 uploads and transmits the plurality of read and collected tag IDs to the blog server SSr (service server SS serving as a WEB server, for example) with corresponding read-out time and date, respectively. The data transmitted/received at this time is the above-mentioned low-level data and is transmitted/received in the specific interface format. The blog server SSr having received that requests the unified server ST for the data corresponding to the plurality of tag IDs, respectively (for data request, see the example shown in FIGS. 12B, 13B). The unified server ST having received it detects data corresponding to each tag ID and responds and transmits it in the form of the higher-lank data to the blog server SSr, respectively. The blog server SSr extracts the necessary contents from the received plural data, respectively, associates the tag ID with read-out time, respectively, and creates a document for disclosure (HTML format file and the like).

At this time, description of data is supplemented by phrases so as to be read easily as sentences in the journal format. That is, as in the illustrated example sentence, if the name of the book is "XXX", the description is supplemented as "borrowed book XXX at library". Then, a blog can be created by storing the created document for disclosure in association with date and disclosing it on the wide-area network NW.

As in the above-mentioned case, if the data obtained from the unified server ST is described in a blog to be widely disclosed on the wide-area network NW, an URL for affiliate may be added in the higher-lank data returned for response from the unified server ST. The affiliate here means an advertisement method in which a link is provided from a WEB site and the like to a business site and the like, and when a website audience purchases goods at the business site via the link, a reward or privilege is given to an organizer of the site providing the link.

In this case, as shown in FIG. 22, the blog server SSr makes an access to the unified server ST through the URL reflecting the tag ID and transmits the user information at the same time. Then, the unified server ST having received it detects data corresponding to each tag ID, creates a URL for affiliate (see the underlined portion) reflecting the user information and returns for response the higher-lank data in which the URL is inserted in the detailed item to the blog server SSr. Then, the blog server SSr creates a blog so that the URL for affiliate is linked to the description of the data on the blog (the shop name "Unaryo" in the illustrated example).

If the request signal of data including the user information is received by the unified server ST as mentioned above, data in various modes or quantity according to the needs of the user can be responded by returning a response signal (higher-lank data) processed into a form corresponding to the user information so that precise services can be provided.

Also, other than the above described, methods by the above embodiments and each variation may be combined as appropriate for use.

Though not individually exemplified, the present invention is put into practice with various changes in a range not departing from its gist.

What is claimed is:

1. An information service system comprising:
a plurality of service servers configured to carry out services, each of said service servers carrying out an individual service by a corresponding individual application;
a single unified server provided in common to said plurality of service servers via network connection; and
a terminal device using data held in said unified server,
said unified server including:
a first transmission/reception portion capable of practicing information transmission/reception with respect to each of said plurality of service servers and said terminal device using a common interface format; and
a common database in a data format corresponding to said common interface format;
each of said plurality of service servers including:
a second transmission/reception portion capable of practicing information transmission/reception by means of using said common interface format with respect to said first transmission/reception portion of said unified server;
a third transmission/reception portion capable of practice information transmission/reception with respect to a plurality of service terminals by means of using an interface format specific to said individual application, said plurality of service terminals using the individual application in common; and
a data format conversion processing portion configured to carry out data format conversion processing between higher-rank data transmitted/received with respect to said unified server by means of using said common interface format through said second transmission/reception portion and lower-rank data transmitted/received with respect to said plurality of service terminals by means of using said specific interface format through said third transmission/reception portion; and
said terminal device including:
a fourth transmission/reception portion capable of practicing information transmission/reception with respect to said first transmission/reception portion of said unified server by means of using said common interface format;
wherein said common database is an XML database using an XML format as said data format corresponding to said common interface;
said second transmission/reception portion of said service server carries out information transmission/reception with respect to said first transmission/reception portion of said unified server by means of using said common interface format corresponding to the XML format;
said data format conversion processing portion of said service server carries out said data format conversion processing between said higher-rank data in the XML format and said lower-rank data in the data format specific to said individual application; and
said fourth transmission/reception portion of said terminal device carries out information transmission/reception with respect to said first transmission/reception portion of said unified server by means of using aid common interface format corresponding to the XML format; and wherein
the information service system further comprises:
an apparatus for producing RFID tags connected to said service server, said apparatus for producing RFID tags being configured to produce a RFID tag in which tag identification information corresponding to said lower-rank data is written via radio communication, wherein:
said data format conversion processing portion coverts said lower-rank data in said specific data format corresponding to said tag identification information into said higher-rank data in said XML format in a form corresponding to the tag identification information;
said common database stores and holds said higher-rank data in said XML format corresponding to said tag identification information; and
said first transmission/reception portion of said unified server transmits, when receiving an inquiry signal including said tag identification information from said fourth transmission/reception portion of said terminal device or said second transmission/reception portion of said service server, a response signal to said fourth transmission/reception portion or said second transmission/reception portion, said response signal including said higher-rank data corresponding to said tag identification information.

2. The information service system according to claim 1, wherein:
said data format conversion processing portion of said service server carries out said data format conversion processing so that said higher-rank data in said XML format has a data item specific to each of said plurality of service servers and a data item common to said plurality of service servers.

3. The information service system according to claim 2, wherein:
   said common data items of said higher-rank data include security response elements; and
   said first transmission/reception portion of said unified server transmits, only when receiving an inquiry signal corresponding to said security response elements from said fourth transmission/reception portion of said terminal device or said second transmission/reception portion of said service server, a corresponding response signal to said fourth transmission/reception portion or said second transmission/reception portion.

4. The information service system according to claim 2, wherein:
   said fourth transmission/reception portion of said terminal device or said second transmission/reception portion of said service server transmits an inquiry signal including user information to said first transmission/reception portion of said unified server; and
   said first transmission/reception portion of said unified server transmits, when receiving said inquiry signal including user information from said fourth transmission/reception portion of said terminal device or said second transmission/reception portion of said service server, a response signal to said fourth transmission/reception portion or said second transmission/reception portion, said response signal being processed into a form corresponding to said user information.

5. The information service system according to claim 1, wherein:
   said terminal device includes an information acquisition portion configured to get said tag identification information stored in said RFID tag via radio communication; and
   said fourth transmission/reception portion transmits said inquiry signal including said tag identification information gotten by said information acquisition portion.

6. The information service system according to claim 5, wherein:
   said first transmission/reception portion of said unified server transmits, when receiving said inquiry signal including a plurality of said tag identification information from said fourth transmission/reception portion of said terminal device or said second transmission/reception portion of said service server, a response signal to said fourth transmission/reception portion or said second transmission/reception portion, said response signal collectively including a plurality of said higher-rank data, each of the plurality of higher-rank data corresponding to one of the plurality of tag identification information.

* * * * *